(12) United States Patent
Knight et al.

(10) Patent No.: US 11,695,633 B2
(45) Date of Patent: *Jul. 4, 2023

(54) NETWORK TOPOLOGY BACKUP

(71) Applicant: Alarm.com Incorporated, Tysons, VA (US)

(72) Inventors: Matthew Flannery Knight, Boston, MA (US); John Douglas Penning, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/324,233

(22) Filed: May 19, 2021

(65) Prior Publication Data
US 2021/0273851 A1    Sep. 2, 2021

Related U.S. Application Data

(63) Continuation of application No. 16/734,656, filed on Jan. 6, 2020, now Pat. No. 11,038,756, which is a (Continued)

(51) Int. Cl.
*H04L 41/0853* (2022.01)
*H04L 45/02* (2022.01)
(Continued)

(52) U.S. Cl.
CPC ........ *H04L 41/0856* (2013.01); *H04L 41/084* (2013.01); *H04L 41/12* (2013.01);
(Continued)

(58) Field of Classification Search
CPC ... H04L 41/0856; H04L 41/084; H04L 41/12; H04L 45/02; H04W 40/248; Y02D 30/70; Y04S 40/00
See application file for complete search history.

(56) References Cited

U.S. PATENT DOCUMENTS

| | | |
|---|---|---|
| 5,689,646 A | 11/1997 | Thorson |
| 6,185,612 B1 * | 2/2001 | Jensen .................. H04L 41/12 709/242 |

(Continued)

*Primary Examiner* — Ayaz R Sheikh
*Assistant Examiner* — Tarell A Hampton
(74) *Attorney, Agent, or Firm* — Fish & Richardson P.C.

(57) ABSTRACT

A method is described that determines that a replacement node device has been connected to a mesh network, the replacement node device corresponding to an original node that has been removed from the mesh network. In response to determining that the replacement node device has been connected to the mesh network, network topology data is accessed that specifies one or more data routing configurations that are each associated with a node device included in the mesh network. From among the one or more data routing configurations specified by the network topology data, a particular data routing configuration is identified that is associated with the original node device that has been removed from the mesh network. Data that specifies the particular data routing configuration that is associated with the original node device that has been removed from the mesh network is provided to the replacement node device.

20 Claims, 9 Drawing Sheets

Related U.S. Application Data continuation of application No. 15/998,983, filed on Aug. 20, 2018, now Pat. No. 10,530,651, which is a continuation of application No. 14/584,785, filed on Dec. 29, 2014, now Pat. No. 10,057,123.

(60) Provisional application No. 61/921,289, filed on Dec. 27, 2013.

(51) Int. Cl.
    *H04W 40/24*     (2009.01)
    *H04L 41/12*     (2022.01)
    *H04L 41/084*     (2022.01)

(52) U.S. Cl.
    CPC .......... *H04L 45/02* (2013.01); *H04W 40/248* (2013.01); *Y02D 30/70* (2020.08)

(56) References Cited

U.S. PATENT DOCUMENTS

| | | |
|---|---|---|
| 6,947,982 B1 | 9/2005 | McGann et al. |
| 7,848,255 B2 | 12/2010 | Suzuki et al. |
| 8,392,737 B2 | 3/2013 | Sharma et al. |
| 8,509,923 B2 | 8/2013 | Koskan et al. |
| 8,570,859 B1 | 10/2013 | Satapathy et al. |
| 8,768,265 B2 | 7/2014 | Folden et al. |
| 8,923,186 B1 | 12/2014 | daCosta |
| 8,982,754 B2 | 3/2015 | Filoso et al. |
| 9,092,223 B1 | 7/2015 | Pani et al. |
| 10,057,123 B1 | 8/2018 | Knight et al. |
| 10,212,222 B2 | 2/2019 | Stoica et al. |
| 2002/0044549 A1 | 4/2002 | Johansson et al. |
| 2003/0120809 A1 | 6/2003 | Bellur et al. |
| 2003/0123419 A1 | 7/2003 | Rangnekar et al. |
| 2003/0212821 A1 | 11/2003 | Gillies et al. |
| 2004/0059805 A1* | 3/2004 | Dinker ................ G06F 11/2069 709/201 |
| 2004/0078625 A1 | 4/2004 | Rampuria et al. |
| 2004/0098502 A1 | 5/2004 | Xu et al. |
| 2004/0125776 A1 | 7/2004 | Haugli et al. |
| 2004/0174829 A1 | 9/2004 | Ayyagari |
| 2004/0218602 A1 | 11/2004 | Hrastar |
| 2005/0073958 A1 | 4/2005 | Atlas et al. |
| 2005/0093130 A1 | 5/2005 | Horie |
| 2005/0135231 A1 | 6/2005 | Bellovin |
| 2005/0163080 A1* | 7/2005 | Suh ................... H04W 36/0016 370/331 |
| 2005/0169185 A1 | 8/2005 | Qui et al. |
| 2005/0201300 A1 | 9/2005 | Bridgelall |
| 2005/0240386 A1 | 10/2005 | Carballo et al. |
| 2006/0092855 A1 | 5/2006 | Chiu |
| 2006/0126501 A1 | 6/2006 | Ramaswamy |
| 2006/0159024 A1 | 7/2006 | Hester |
| 2006/0198346 A1 | 9/2006 | Liu et al. |
| 2006/0268791 A1 | 11/2006 | Cheng et al. |
| 2007/0038743 A1 | 2/2007 | Hellhake et al. |
| 2007/0050240 A1 | 3/2007 | Belani et al. |
| 2007/0150565 A1 | 6/2007 | Ayyagari et al. |
| 2007/0177511 A1 | 8/2007 | Das et al. |
| 2007/0177538 A1 | 8/2007 | Christensen et al. |
| 2007/0248047 A1 | 10/2007 | Shorty et al. |
| 2007/0286097 A1 | 12/2007 | Davies |
| 2007/0291722 A1 | 12/2007 | Lee |
| 2008/0170513 A1 | 7/2008 | Niranjan et al. |
| 2008/0192713 A1 | 8/2008 | Mighani |
| 2008/0291910 A1 | 11/2008 | Tadimeti et al. |
| 2009/0138777 A1 | 5/2009 | Veillette |
| 2009/0185508 A1 | 7/2009 | Duke et al. |
| 2009/0252102 A1 | 10/2009 | Seidel et al. |
| 2010/0002601 A1 | 1/2010 | Carta et al. |
| 2010/0002707 A1 | 1/2010 | Chang |
| 2010/0039940 A1 | 2/2010 | Wang et al. |
| 2010/0082513 A1 | 4/2010 | Liu |
| 2010/0204847 A1 | 8/2010 | Leete, III et al. |
| 2010/0260071 A1 | 10/2010 | Lai et al. |
| 2010/0284038 A1 | 11/2010 | Hosogoshi |
| 2010/0329260 A1 | 12/2010 | Kim et al. |
| 2011/0051644 A1 | 3/2011 | Huang et al. |
| 2011/0090785 A1 | 4/2011 | Shimizu et al. |
| 2011/0188420 A1 | 8/2011 | Filoso et al. |
| 2011/0320379 A1 | 12/2011 | Roslak et al. |
| 2012/0047551 A1 | 2/2012 | Pattar et al. |
| 2012/0244869 A1 | 9/2012 | Song et al. |
| 2012/0256733 A1 | 10/2012 | Carr |
| 2012/0294187 A1 | 11/2012 | Chau et al. |
| 2012/0324273 A1 | 12/2012 | Shaffer et al. |
| 2013/0137378 A1 | 5/2013 | Folden et al. |
| 2013/0159550 A1 | 6/2013 | Vasseur |
| 2013/0191659 A1 | 7/2013 | Ree et al. |
| 2013/0286917 A1 | 10/2013 | Jia et al. |
| 2013/0294285 A1 | 11/2013 | Zhang et al. |
| 2014/0085105 A1 | 3/2014 | Vaswani et al. |
| 2014/0126392 A1 | 5/2014 | George et al. |
| 2014/0169349 A1 | 6/2014 | Vyas et al. |
| 2014/0258498 A1 | 9/2014 | Banerjee et al. |
| 2014/0293828 A1 | 10/2014 | Lee et al. |
| 2015/0023155 A1 | 1/2015 | Shanmugavadivel et al. |
| 2015/0092595 A1 | 4/2015 | Wetterwald et al. |
| 2015/0092651 A1 | 4/2015 | Chow |
| 2015/0350027 A1 | 12/2015 | Raissinia et al. |
| 2017/0070387 A1 | 3/2017 | Rao et al. |

\* cited by examiner

NETWORK TOPOLOGY BACKUP

CROSS-REFERENCE TO RELATED APPLICATIONS

This application is a continuation of U.S. application Ser. No. 16/734,656, filed Jan. 6, 2020, now allowed, which is a continuation of U.S. application Ser. No. 15/998,983, filed Aug. 20, 2018, now U.S. Pat. No. 10,530,651, issued Jan. 7, 2020, which is a continuation of U.S. application Ser. No. 14/584,785, filed Dec. 29, 2014, now U.S. Pat. No. 10,057,123, issued Aug. 21, 2018, which claims the benefit of U.S. Provisional Application No. 61/921,289, filed Dec. 27, 2013. All of these prior applications are incorporated herein by reference in their entirety for all purposes.

TECHNICAL FIELD

This application relates to restoring data routing configurations for node devices in a network.

BACKGROUND

A network, such as a mesh network, can be associated with a network topology that specifies, for each node device in the network, a routing configuration that enables the node device to communicate with other node devices in the network or with other systems outside of the network.

SUMMARY

Techniques are described for restoring a routing configuration associated with a replaced node device of a network to enable the replacement node device to communicate with other node devices in the network or with other systems outside of the network.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description of the drawings.

DETAILED DESCRIPTION

Figure 1A:
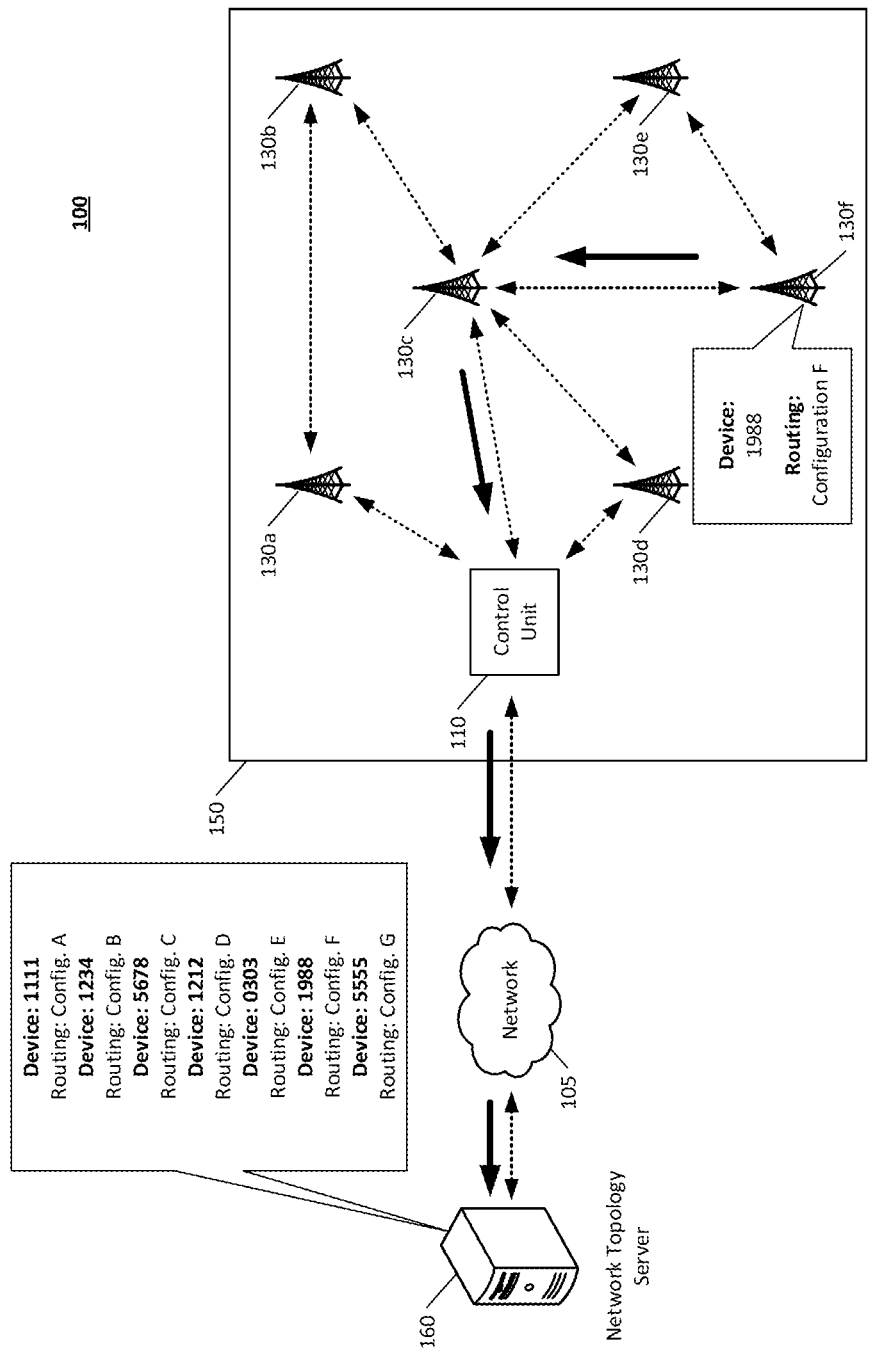
FIGS. 1A-1C illustrate an example of restoring a network topology.

Techniques are described for utilizing a network backend to back up and restore a wireless network topology. In some implementations, a wireless network that includes one or more nodes, such as a property monitoring system that includes remote sensor node devices, is associated with a network topology that specifies data routing configurations that allow nodes of the wireless network to send and receive data between other nodes of the wireless network and between the nodes of the wireless network and external systems. The data routing configuration associated with a particular node is unique to that node and allows that node to communicate with other nodes of the monitoring system network, including a control unit of the wireless network. Each node can store information identifying the data routing configuration relevant to that node. For example, a node can store data in the form of a source routed network table that is relevant to that node locally at that node, for example, in an Electrically Erasable Programmable Read-Only Memory (EEPROM) associated with the node. The information identifying the data routing configuration relevant to the particular node can be stored at a network backend that can include a server or other computing device capable of storing the information identifying the network topology of the wireless network, including the data routing configurations associated with each of the nodes of the wireless network. For example, a monitoring system may have a control unit and one or more wireless sensor nodes, and the monitoring system may store a network topology that specifies data routing configurations for each of the control unit and the one or more wireless sensor nodes. If a node of the monitoring system having a particular data routing configuration is replaced with a replacement node device, the replacement node device will not initially utilize the data routing configuration associated with the replaced node to communicate with the other nodes of the wireless network, and will therefore have to be programmed to utilize this data routing configuration to communicate with the other nodes of the wireless network. Because the network topology for the wireless network was stored at the backend, the particular data routing configuration corresponding to the replaced node of the wireless network may be provided to the replacement node and used by the replacement node without performing separately performing programming and discovery processes. Using this data routing configuration, the replacement node can communicate with other nodes of the wireless network and external systems as though it were the replaced node. Thus, by storing a backup of the network topology and providing the data routing configuration of the replaced node device to the replacement node device, all of the nodes of the wireless network can utilize the existing network topology to communicate with all nodes of the wireless network, without having to perform a rediscovery process to determine a new network topology for the monitoring system with the replaced node.

In some implementations, a system associated with the wireless network, such as a monitoring system, may operate one or more node devices that are configured to communicate with other node devices of the system and to communicate with a control unit of the system. For example, the system may be a monitoring system that is associated with one or more remote sensor nodes that are configured to detect conditions at a property associated with the monitoring system. The remote sensor nodes can communicate with other node devices, including other remote sensor nodes or a control unit of the monitoring system, using one or more wireless network protocols, such as the Z-Wave network protocol. The wireless network associated with the monitoring system may be associated with a network topology that specifies, for each node device of the monitoring system, information that specifies a data routing configuration associated with that node device. For example, a data routing configuration can specify how data transmitted by that node device is directed through the monitoring system's wireless network. The monitoring system can back up the data routing configurations associated with and stored at each of the node devices at a network backend. This information is stored as a network topology for the monitoring system's wireless network.

When a particular node device is removed from the monitoring system, for example, as a result of a particular remote sensor node being defective and requiring replacement, the removed node device can be replaced by a replacement node device. In response to detecting the presence of the replacement node device, the monitoring system can access the network topology information associated with the wireless network, and can identify a data routing configuration corresponding to the removed node device and stored at the network backend. The monitoring system can provide the data routing configuration information associated with the removed node device to the replacement node device. The replacement node device can store the data routing configuration information associated with the replaced node device, and can utilize the data routing configuration information associated with the replaced node device to send data between other node devices of the monitoring system, between the replacement node device and the monitoring system control unit, or between the replacement node device and systems outside of the wireless network. For instance, a replacement remote sensor node can utilize the data routing configuration information associated with a replaced remote sensor node to transmit data obtained by the replacement remote sensor node to other node devices of the monitoring system's wireless network. Additionally, by providing the replacement node device with the data routing configuration information associated with the replaced node device, the other node devices of the monitoring system's wireless network can communicate with the replacement node device as though they are still communicating with the original, replaced node device. By spoofing the other node devices of the monitoring system's wireless network, these other node devices are effectively unaware that the replacement of the original, replaced node device occurred. This enables operators of the monitoring system to bypass performing a rediscovery operation to determine a network topology for monitoring system's wireless network, since all of the node devices of the monitoring system can utilize the backed up network topology.

Figure 1B:
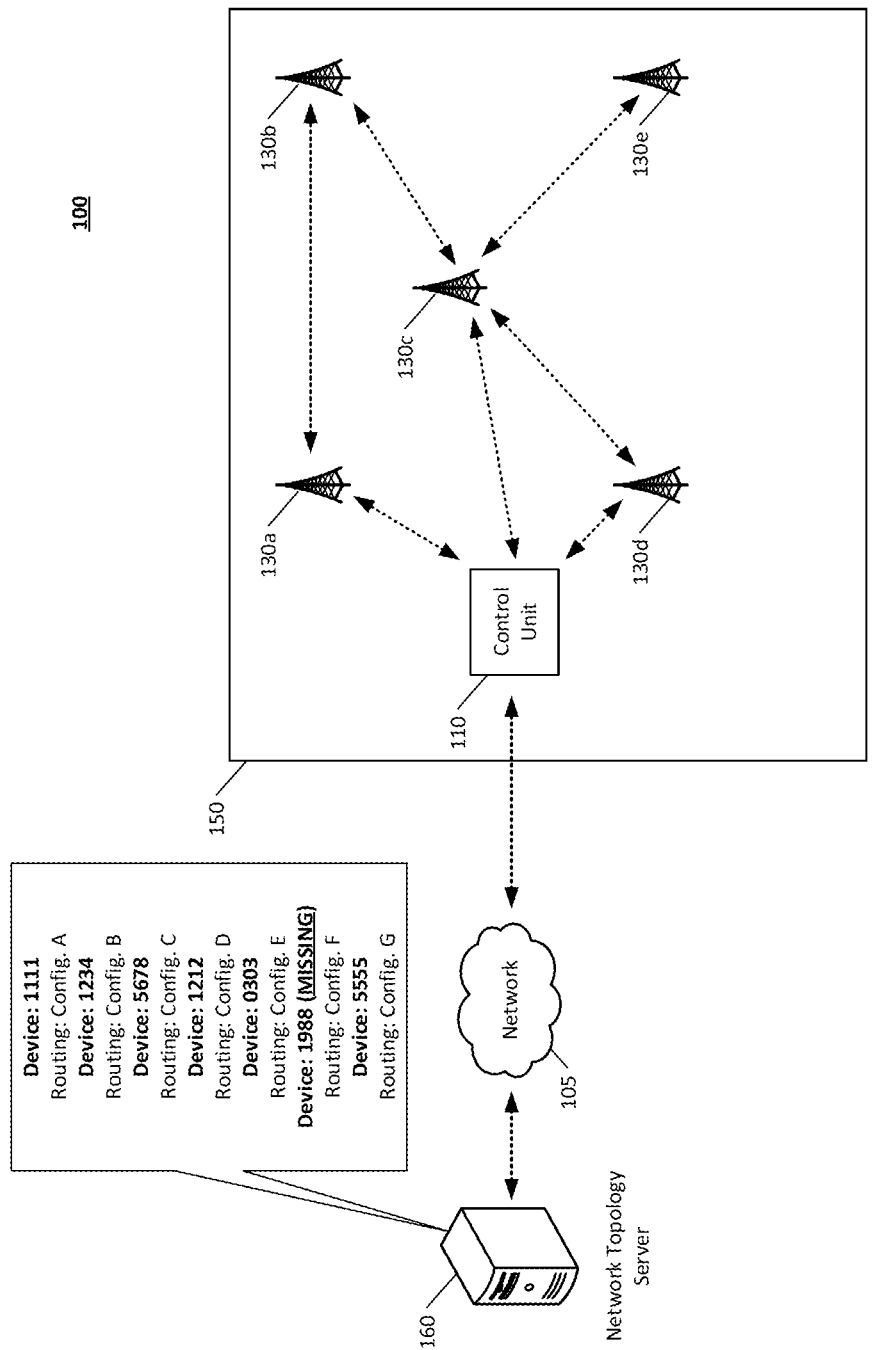
Figure 1C:
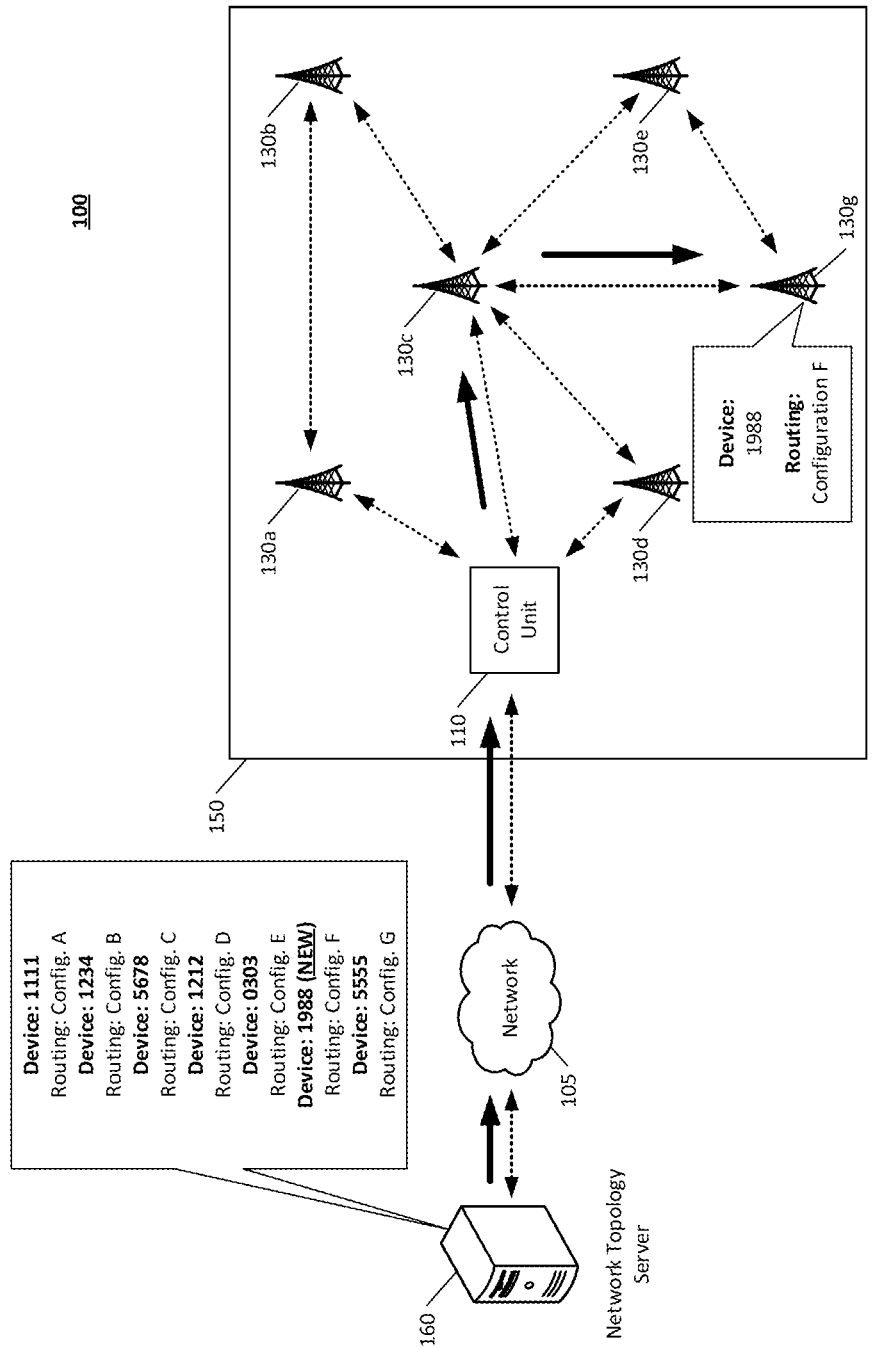

FIGS. 1A-1C illustrate an example of backing up and restoring a network topology for a system's wireless network. For example, a monitoring system 100 can determine to backup the wireless network's topology, and can do so by storing a backup of the data routing configuration of each node device 130a-130f associated with the monitoring system's wireless network as network topology data for the monitoring system 100. The monitoring system 100 can then restore the wireless network's topology when a new node device 130g is connected to the monitoring system's wireless network to replace a removed node device 130f by identifying a data routing configuration from the network topology data that corresponds to the removed node device 130f and providing the data routing configuration to the new node device 130g.

FIG. 1A shows monitoring system 100 that is associated with a property 150. The monitoring system 100 includes node devices 130a-130g, a control unit 110, and a network topology server 160 that is in communication with the control unit 110 over the network 105. At FIG. 1A, a request has been provided to the monitoring system 100 to cause a backup of the monitoring system's wireless network topology to be stored at the network topology server 160. Based on the monitoring system 100 determining to backup the network topology in response to the request, each of the node devices 130a-130f can transmit information specifying the data routing configuration associated with that node device 130a-130f to the network topology server 160 via the control unit 110 and the network 105. For example, as shown in FIG. 1A, the node device 130f can transmit a data routing configuration "Configuration F" to the network topology server 160 via the control unit 110. The data routing configuration "Configuration F" can specify how the node device 130f communicates with other node devices 130a-130e and/or the control unit 110 of the monitoring system 100, as well as how the node device 130f can communicate with the network topology server 160. For instance, the data routing configuration "Configuration F" may specify that the node device 130f communicates with the node devices 130a-130e, the control unit 110, and the network topology server 160 through the node devices 130c and 130e. Optionally, the data routing configuration can also include a device identifier or "Device ID," "1988," that is also transmitted to the network topology server 160, where the device ID identifies the particular node device 130f. The control unit 110, acting as a gateway for the node devices 130a-130f to communicate with the network topology server 160 over the network 105, can receive the data routing configuration information and can provide the data routing configuration information to the network topology server 160. The network topology server 160 can receive the information specifying the data routing configuration of the node device 130f, and can store the data routing configuration as part of the network topology for the wireless network of the monitoring system 100.

For example, the network topology server 160 can store a network topology for the monitoring system's wireless network that specifies data routing configurations for each of the node devices 130a-130f of the monitoring system 100. As shown in FIG. 1A, for example, the network topology server 160 can store a network topology for the wireless network of the monitoring system 100 that specifies a data routing configuration "Configuration A" for the node device 130a associated with the device ID "1111," a routing configuration "Configuration B" for the node device 130b associated with the device ID "1234," a routing configuration "Configuration C" for the node device 130c associated with the device ID "5678," a data routing configuration "Configuration D" for the node device 130d associated with the device ID "1212," a data routing configuration "Configuration E" for the node device 130e associated with the device ID "0303," a data routing configuration "Configuration F" for the node device 130f associated with the device ID "1988," and a data routing configuration "Configuration G" for the control unit 110 associated with the device ID "5555."

In some implementations, each of the node devices 130a-130f can transmit information specifying their respective data routing configurations for the backup network topology of the monitoring system's wireless network at the same time, or at different times. For example, the node devices 130a-130f can transmit information specifying their respective data routing configurations in response to receiving a request that all nodes backup their data routing configurations to create a new backup of the entire network topology of the monitoring system's wireless network. Alternatively, individual node devices 130a-130f can transmit information specifying their data routing configurations for backup in response to requests identifying backup of the data routing configurations of the individual node devices 130a-130f, to create a backup network topology that includes the most recent data routing configurations used by those individual node devices 130a-130f.

In some implementations, requests to backup the monitoring system's network topology or data routing configurations of specific nodes of the monitoring system's wireless network can be provided in response to a user input, in response to a predetermined period of time having passed, based on a current time, day, or date matching a predetermined time, day, or date, based on the monitoring system 100 detecting one or more conditions or events associated with the monitoring system 100 or the property 150, or based on other information. For example, the monitoring system 100 may determine to backup its wireless network topology based on determining that a power outage is likely to affect the property 150 in the near future, based on the monitoring system 100 determining that the monitoring system 100 is operating inefficiently, or based on the monitoring system 100 determining that one or more nodes, such as the control unit 110 or the node devices 130a-130f, have been replaced, added, or removed from the monitoring system's wireless network.

As shown at FIG. 1B, the node device 130f has been removed from the monitoring system's wireless network. For example, the node device 130f may stop working properly (e.g., due to a malfunction or drained battery), may be removed from the wireless network by a user of the property 150, may lose connectivity to the one or more other node devices 130a-130e and/or the control unit 110, or may otherwise be detected as no longer being a part of the wireless network associated with the monitoring system 100.

The monitoring system 100 may detect the absence of the node device 130f, and may flag or otherwise indicate that the node device 130f is missing from the monitoring system's wireless network. For example, the monitoring system 100 may determine that the node device 130f has been removed from the wireless network, and may flag the node device 130f as missing from the wireless network at the network topology server 160, for example, by identifying the node device 130f as "missing" in the backup network topology of the monitoring system's wireless network.

At FIG. 1C, the monitoring system 100 determines that a node device 130g has been connected to the monitoring system's wireless network. For example, the node device 130g can be a replacement for the node device 130f, may be a different device from the node device 130f, may be the node device 130f that has been repaired or reconnected to the wireless network, or can be any other device that is capable of connecting to the wireless network of the monitoring system 100 and communicating with the other node devices 130a-130e and/or the control unit 110 of the monitoring system 100. Based on determining that the node device 130g has been connected to the wireless network or based on the monitoring system 100 receiving an indication that the node device 130g has been connected to the monitoring system 100, the monitoring system 100 can use the backup network topology of the monitoring system's wireless network to enable the node device 130g to communicate with other node devices 130a-130e of the monitoring system and/or the control unit 110.

For example, the monitoring system 100 can determine that the node device 130g that is new to the wireless network has been connected to the wireless network, and can determine a data routing configuration for the node device 130g that will enabled the node device 130g to communicate with the node devices 130a-130g, the control unit 110, and/or the network topology server 160. Determining a data routing configuration for the node device 130g can include determining that the connection of the node device 130g corresponds to, or is a replacement of, the connection of the node device 130f to the wireless network. The monitoring system 100 may otherwise determine that the node device 130g has been connected to the monitoring system's wireless network and can utilize the data routing configuration associated with the node device 130f to communicate with the other node devices 130a-130e, the control unit 110, and/or the network topology server 160 of the monitoring system 100. For example, the monitoring system 100 may determine that the node device 130g is within range of the node devices 130c and 130e, and therefore can use the data routing configuration "Configuration F" to communicate in the monitoring system's wireless network.

Based on determining that the node device 130g can utilize the data routing configuration "Configuration F," the monitoring system 100 can provide the data routing configuration "Configuration F" to the node devices 130g. For example, the monitoring system 100 may determine a data communication path used to communicate to the node device 130g, perhaps by borrowing a data communication path previously used to communicate with the node device 130f, and can transmit data specifying the data routing configuration "Configuration F" to the node device 130g. For instance, data specifying the data routing configuration "Configuration F" may be transmitted from the network topology server 160 over the network 105 to the control unit 110, and from the control unit 110 through the node device 130c to reach the node device 130g.

The node device 130g may receive the data specifying the data routing configuration "Configuration F" and utilize the data routing configuration "Configuration F" to communicate with other node devices 130a-130e of the monitoring system 100, with the control unit 110, and/or with the network topology server 160. For example, the data routing configuration "Configuration F" may associated the device ID "1988" that previous identified node device 130f with the node device 130g, and the node device 130g may utilize the data communication pathways previously utilized by the node device 130f to communication with node devices 130a-130e, the control unit 110, and/or the network topology sever 160 associated with the monitoring system 100. Associating the node device 130g with the device ID "1988" previously utilized by the node device 130f also allows the other node devices 130a-130e, the control unit 110, and/or the network topology server 160 to communicate with the node device 130g as if the node device 130g is the node device 130f, thereby "spoofing" the node device 130g to appear as the node device 130f. By spoofing the node device 130g, the other node devices 130a-130e, the control unit 110, and/or the network topology server 160 can communicate with the node device 130g without having to obtain updated data routing configurations that include data communication pathways to communicate with the node device 130g. Instead, these node devices 130a-130e, the control unit 110, and the network topology server 160 can continue communicate with the node device 130g as if the network topology of the monitoring system's wireless network has not changed, that is, using the previously determined data communication pathways that were used to communicate with the node device 130f. In some implementations, the node device 130g may store the data specifying the data routing configuration "Configuration F" at a data storage unit associated with the node device 130g.

Figure 2:
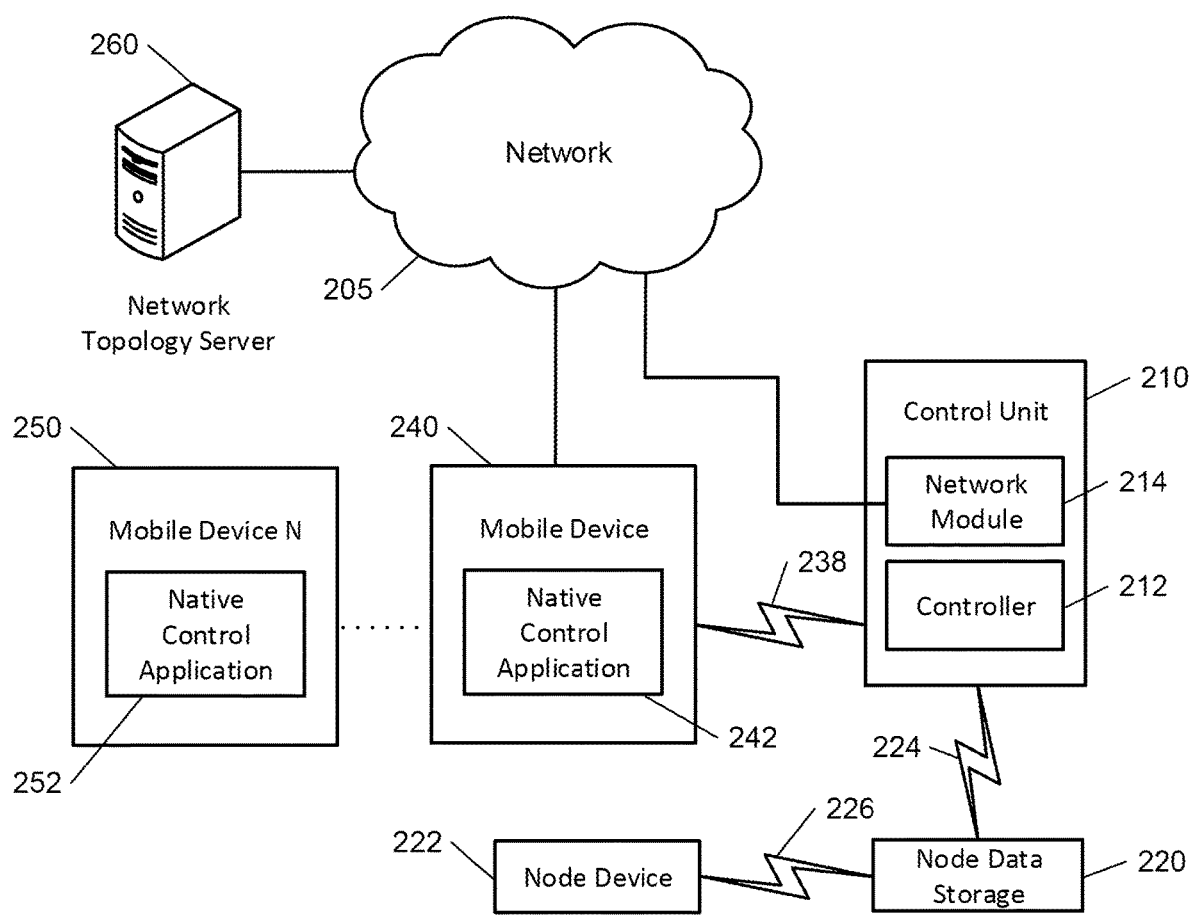
FIG. 2 illustrates an example system capable of restoring a network topology.

FIG. 2 illustrates an example of a system, such as a monitoring system 200 configured to back up and restore a network topology associated with a wireless network for the monitoring system 200. The monitoring system 200 includes a network 205, a control unit 210, one or more mobile devices 240, 250, and a network topology server 260. The network 205 enables communications between the control unit 210, the one or more mobile devices 240, 250, and the network topology server 260.

The network 205 is configured to enable electronic communications between devices connected to the network 205. For example, the network 205 can be configured to enable the exchange of electronic communications between the control unit 210, the one or more mobile devices 240, 250, and the network topology server 260. Additionally, a particular mobile device 240, 250 or the control unit 210 may communicate with any of the network topology server 260, the control unit 210, and/or other mobile devices 240, 250 through the network 205, and such communications may utilize electronic communications transmitted through other component gateways. For example, a particular mobile device 240, 250 may communicate with one or more other mobile devices 240, 250 by sending electronic communications to the network topology server 260 or the control unit 210 over the network 205, and the network topology server 260 and/or the control unit 210 may transmit the electronic communications to the recipient mobile devices 240, 250.

The network 205 can include, for example, one or more of the Internet, Wide Area Networks (WANs), Local Area Networks (LANs) (e.g., Wi-Fi), analog or digital wired and wireless telephone networks (e.g., a public switched telephone network (PSTN)), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 205 can include multiple networks or subnetworks, each of which can include, for example, a wired or wireless data pathway. The network 205 can include a circuit-switched network, a packet-switched data network, or any other network able to carry electronic communications (e.g., data or voice communications). For example, the network 205 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 205 can include one or more networks that include wireless data channels and wireless voice channels. The network 205 can be a wireless network, a broadband network, or a combination of networks including a wireless network and a broadband network.

The control unit 210 includes a controller 212 and a network module 214. The controller 212 is configured to control a device system that includes the control unit 210. For instance, the controller 212 may be configured to control one or more node devices associated with a wireless network located at a property that is monitored by the monitoring system 200. In some examples, the controller 212 can include a processor or other control circuitry configured to execute instructions of a program that controls operations of one or more remote sensor nodes or other node devices (e.g., one or more notification node devices, sensor node devices or control node devices, such as Z-Wave locks). In these examples, the controller 212 can be configured to receive input from one or more remote sensor nodes associated with the monitoring system 200 of the property, receive information associated with one or more users of the property, or to receive other information, and control operation of the one or more remote sensor nodes or other node devices (e.g., one or more node devices configured to provide notifications to users of the property), or control operation of other devices associated with the property or the monitoring system 200. For example, the controller 212 can be configured to control operation of the network module 214 included in the control unit 210. In some examples, the controller 212 can be configured to receive or transmit information associated with a network topology of the wireless network for the monitoring system 200. The controller 212 can be configured to control operation of the network module 214 included in the control unit 210 based on the information associated with the network topology of the wireless network for the monitoring system 200.

The network module 214 is a communication device configured to exchange communications over the network 205. The network module 214 can be a wireless communication module configured to exchange wireless communications over the network 205. For example, the network module 214 can be a wireless communication device configured to exchange communications over a wireless data channel. In this example, the network module 214 can transmit sensor data captured by one or more sensors of the monitoring system 200 associated with the property, data associated with controlling one or more notification devices, data associated with users of the property, or other information over a wireless data channel. The wireless communication device can include one or more GSM or LTE modules, a radio modem, a cellular transmission module, or any type of module configured to exchange communications in one of the following formats: GSM or GPRS, CDMA, EDGE or EGPRS, EV-DO or EVDO, UMTS, or IP.

The network module 214 can also be a wired communication module configured to exchange communications over the network 205 using a wired connection. For instance, the network module 214 can be a modem, a network interface card, or another type of network interface device. The network module 214 can be an Ethernet network card configured to enable the control unit 210 to communicate over a local area network and/or the Internet. The network module 214 can also be a voiceband modem configured to enable the control unit 210 to communicate over the telephone lines of Plain Old Telephone Systems (POTS). In some implementations, the control unit 210 can be a broadband or cellular gateway where the network module 214 can enable the control unit 210 to communicate over the network 205.

The monitoring system 200 that includes the control unit 210 communicates with the node interfaces 220 to receive and transmit network topology information. For example, a node interface 220 can be a radio component or other wired or wireless communication component associated with a particular node device 222 of the monitoring system that enables the node device 222 to communicate with one or more other components of the monitoring system, such as one or more other node devices 222, the control unit 210, one or more mobile devices 240, 250, and/or the network topology server 260. The node interfaces 220 are connected to one or more node devices 222 (e.g., one or more remote sensor nodes, notification node devices, control node devices, etc.) and are configured to control communications of the one or more node devices 222. The node interfaces 220 can communicate information to or from the control unit 210 and can control the one or more node devices 222 based on commands or other information received from the control unit 210.

In some implementations, the node interfaces 220 associated with the one or more node devices 222 can be integrated with the node devices 222 and/or the control unit 210. For example, the node devices 222 can include the control unit 210 and the node interfaces 220 (e.g., as internal components of the node devices 222). In some examples, the control unit 210 can be a gateway device that communicates with one or more node interfaces 220 that are internal components of one or more node devices 222. In some examples, the node interfaces 220 are node interfaces 220 that each communicate with a single node device 222, or are node interfaces 220 that are capable of communicating with one or more node devices 222.

The node devices 222 can be configured to send data between nodes of the monitoring system's wireless network and the control unit 210 based on network topology information sent and/or received by the node interfaces 220. For example, a node interface 220 can receive information associated with a backup network topology (e.g., a network topology that was previously stored by the monitoring system) and the node interface 220 can control the node device 222 to send data between other node devices 222 or the control unit 210 of the monitoring system based on the information associated with the backup network topology. The node devices 222 can include one or more remote sensor nodes (e.g., one or more motion sensors, light sensors, humidity sensors, temperature sensors, contact sensors, microphones, noise sensors, etc.), one or more notification node devices (e.g., one or more visual notification devices, such as lights, display panels, liquid crystal displays (LCD), etc.), one or more audible notification devices (e.g., one or more speakers, chimes, or bells, etc.), one or more haptic notification devices (e.g., one or more devices that can apply a pressure, vibration, temperature, or other tactile response detectable by a user of the property), or one or more other notification devices, such as devices that provide notification using a particular scent, taste, noise, visual cue, or haptic response, control node devices (e.g., node devices that are associated with appliances, such as an oven, a thermostat, a dishwasher, a refrigerator, and a range, of a property and that can control the associated appliances and node device that control locks), or any other type of node device that communicates over the local network. Although illustrated as a single node interface 220 and a single node device 222, the system 200 may include multiple node devices 222 for controlling multiple sensor devices, notification devices, or control devices.

The node interfaces 220 can communicate with the controller 212 over communications link 224, and the node devices 222 can communicate with the node interfaces 220 over communication link 226. The communication links 224 and 226 can be wired or wireless data pathways configured to transmit signals from the node interfaces 220 to the control unit 210, and from the node devices 222 to the node interfaces 220. The node interfaces 220 can continuously transmit and receive data from the controller 212, can periodically transmit and receive data from the controller 212, can transmit and receive data from the controller 212 in response to user inputs, such as input provided by an administrator to send or receive network topology information, or can transmit and receive data from the controller 212 in response to detecting events, such as detecting that a node device 222 of the monitoring system has been replaced. The node devices 222 can continuously or periodically transmit and receive information from the node interfaces 220, or can transmit and receive information from the module 220 in response to detecting a specific event (e.g., an error relating to one or more of the node devices 222, or user input requesting transmission of network topology information).

In some implementations, the node devices 222, node interfaces 220, and/or control unit 210 communicate with and receive data according to a network topology associated with the wireless network of the monitoring system 200, where the monitoring system's wireless network can use various local wireless protocols, such as Wi-Fi, Bluetooth, Z-Wave, and ZigBee, or wired protocols, such as Ethernet, USB, HomePlug (Ethernet over powerline), and other wired protocols based on the RS232, RS485, and/or RS422 standards. In some examples, the node devices 222, node interfaces 220, and/or control unit 210 can connect locally to the monitoring system 200 and can send and receive data according to a network topology associated with the local connections of the monitoring system's wireless network.

For example, the control unit 210 can communicate directly with the node devices 222 to send and/or receive information related to controlling the node devices 222, information identifying the status of the node devices 222 (e.g., identifying whether a node device 222 is operating properly, malfunctioning, or has been replaced), or other information. In some instances, the control unit 210 can communicate information directly to both the node devices 222 and the node interfaces 220.

The network topology server 260 is an electronic device configured to receive, store, and transmit network topology information by exchanging electronic communications with the control unit 210, the one or more mobile devices 240, 250, the one or more node devices 222, or the one or more node interfaces 220 over the network 205. For example, the network topology server 260 can be configured to send and/or receive data obtained by the control unit 210. In this example, the network topology server 260 can exchange electronic communications with the network module 214 included in the control unit 210 to send and/or receive information associated with a network topology of the wireless network associated with the monitoring system 200 (e.g., network topology information that indicates how node devices 222 can communicate with other node devices 222 of the monitoring system and/or how node devices 222 can communicate with the control unit 210). The network topology server 260 can also send and/or receive information relating to the network topology of the monitoring system's wireless network, or other data (e.g., sensor data obtained by one or more node devices 222) from the one or more mobile devices 240, 250. For example, the network topology server 260 can send and/or receive information from the mobile devices 240, 250 that identifies a network topology of the monitoring system 200. The network topology server 260 can further receive information relating to events from one or more other sources. For example, the network topology server 260 can receive information over the network 205 relating to potential power outages or other events or conditions that may affect the operation of the monitoring system's wireless network.

In some implementations, the network topology server 260 can be connected to the Internet over the network 205 and can access information at a website or database that is accessible on the Internet. For example, users associated with a property (e.g., a system administrator) can upload network topology information for a wireless network associated with the monitoring system 200 or can provide input to the monitoring system 200 that causes network topology information for the monitoring system's wireless network to be uploaded to a website or database. The network topology information can be accessible to the users associated with the property and the network topology server 260 over the network 205. Based on the accessed network topology information, the network topology server 260 can communicate with the control unit 210 to provide relevant portions of the network topology information to one or more node devices 222 as data routing configurations for the one or more node devices 222.

The network topology server 260 can store data (e.g., information associated with a network topology of the wireless network associated with the monitoring system 200 or information specifying data routing configurations associated with particular node devices 222 of the monitoring system 200) and can perform analysis of the stored data. Based on the analysis, the network topology server 260 can communicate with and control aspects of the control unit 210 and/or one or more node devices 222.

The one or more mobile devices 240, 250 are devices that host one or more native applications (e.g., the native control applications 242, 252). The one or more mobile devices 240, 250 can be cellular phones or non-cellular locally networked devices. The one or more mobile devices 240, 250 can include a cell phone, a smart phone, a tablet PC, a personal digital assistant ("PDA"), a wearable computing device, or any other stationary or portable device configured to communicate over a network. For example, implementations can also include Blackberry-type devices (e.g., as provided by Research in Motion), electronic organizers, iPhone-type devices (e.g., as provided by Apple), iPod devices (e.g., as provided by Apple), or other portable music players, other communication devices, and handheld, wearable, or portable electronic devices for gaming, communications, and/or data organization. The one or more mobile devices 240, 250 can be the same or can include mobile devices of different types. The one or more mobile devices 240, 250 can perform functions unrelated to the monitoring system, such as placing personal telephone calls, playing music, playing video, displaying pictures, browsing the Internet, maintaining an electronic calendar, etc.

In some implementations, the one or more mobile devices 240, 250 communicate with and receive control system data from the control unit 210 using the communication link 238. For instance, the one or more mobile devices 240, 250 can communicate with the control unit 210 using various local wireless protocols, such as Wi-Fi, Bluetooth, Z-Wave, and ZigBee, or wired protocols, such as Ethernet, USB, Home-Plug (Ethernet over powerline), and other wired protocols based on the RS232, RS485, and/or RS422 standards. The one or more mobile devices 240, 250 can connect locally to the monitoring system 200 and its node devices 222 and other devices. The local connection can improve the speed of communications because communicating through the network 205 with a remote server (e.g., the network topology server 260), can be slower.

Although the one or more mobile devices 240, 250 are shown communicating with the control unit 210, the one or more mobile devices 240, 250 can communicate directly with the node devices 222 and/or other devices controlled by the control unit 210. In some implementations, the one or more mobile devices 240, 250 replace the control unit 210 and perform the functions of the control unit 210 for local control and long range or offsite communication and/or control.

In other implementations, the one or more mobile devices 240, 250 receive network topology information captured by the control unit 210 through the network 205. The one or more mobile devices 240, 250 can receive the network topology data from the control unit 210 through the network 205 or from the network topology server 260 and can transmit or relay network topology information to the control unit 210 or the network topology server 260 through the network 205. In this regard, the network topology server 260 can facilitate communications between the one or more mobile devices 240, 250 and the control unit 210.

Although the one or more mobile devices 240, 250 are shown in FIG. 2 as being connected to the network 205, in some implementations, the one or more mobile devices 240, 250 are not connected to the network 205. In these implementations, the one or more mobile devices 240, 250 communicate directly with one or more of the monitoring system components and no network connection (e.g., connection to the Internet), or reliance on remote servers is needed.

In some implementations, the one or more mobile devices 240, 250 are used in conjunction with only local node devices 222 and/or other devices associated with a property. In these implementations, the monitoring system 200 only includes the one or more mobile devices 240, 250, the node devices 222, and the node interfaces 220. The one or more mobile devices 240, 250 can receive data directly from the node devices 222 and/or node interfaces 220 and send data directly to the node devices 222 and/or node interfaces 220. The one or more mobile devices 240, 250 provide the appropriate interfaces and/or processing to provide for control of the monitoring system 200, including modifying the monitoring system's wireless network topology, settings, and/or preferences, controlling the node devices 222, etc. In some examples, the one or more mobile devices 240, 250 communicate directly with only the node devices 222 and the node interfaces 220 to control operation of the node devices 222 associated with the property.

The one or more mobile devices 240, 250 can each include a native control application 242, 252, respectively. The native control application 242, 252 refers to a software/firmware program running on the corresponding mobile devices 240, 250 that enables the described features. The one or more mobile devices 240, 250 can load or install the native control application 242, 252 based on data received over a network or data received from local media. The native monitoring application 242, 252 can run on mobile devices' platforms, such as Apple iOS, iPhone, iPod touch, Blackberry, Google Android, Windows Mobile, Mobile Linux, Firefox OS, etc.

The described monitoring system 200 utilizes a network backend to back up and restore wireless network topologies determined by the nodes of the monitoring system network. Specifically, node devices 222 can each back up a data routing configuration at the network topology server 260, where each data routing configuration enables a node device 222 to communicate with other node devices 222 of the monitoring system 200 and with a control unit 210 of the monitoring system 200. Cumulatively, these data routing configurations constitute the network topology for the monitoring system's wireless network. Each node device 222 of the monitoring system 200, when initially installed, can perform a network discovery process in which the node device 222 attempts to communicate with other node devices 222 and the control unit 210 via every permutation of possible routes among installed node devices 222 and/or the control unit 210.

When a node device 222 determines the data routing pathways through the monitoring system's wireless network, the node device 222 stores data identifying the data routing pathways as a data routing configuration, for example, at the node interface 220. Additionally, the node device 222 transmits information associated with the data routing configuration to the network topology server 260, where the network topology server 260 can store a backup of the data routing configurations of each of the node devices 222 and other nodes of the monitoring system 200 as a network topology of the monitoring system's wireless network. Subsequently, if the node device 222 is replaced, for example, with a new node device 222, the network topology server 260 can provide the new node device 222 with the backup of the data routing configuration pertinent to the replaced node device 222 from the network topology information for the monitoring system's wireless network. Using the data routing configuration from the backup network topology information, the replacement node device 222 can utilize the data routing pathways identified in the data routing configuration to communicate with the other node devices 222 and/or the control unit 210. Enabling the new node device 222 to use the previously determined data routing configuration can effectively spoof other node devices 222 and/or the control unit 210 of the monitoring system, such that the other node devices 222 and/or the control unit 210 will continue to communicate in the monitoring system 200 as though the replaced node device 222 is still a part of the monitoring system 200, when in fact it has been replaced. Similarly, for instances in which a control unit 210 is replaced with a replacement control unit 210, the data routing configuration for the control unit 210 from the backup network topology information can spoof the node devices 222 such that the node devices 222 can continue to communicate with other components of the monitoring system 200 as though the replaced control unit 210 is still a part of the monitoring system 200.

In some implementations of the described system, a network of one or more nodes (e.g., one or more node devices 222 and/or the control unit 210) can utilize a mesh network topology. Each node of the mesh network (e.g., each node device 222 or the control unit 210) is associated with a home identification code (referred to as a home ID), a device identification code (referred to as a device ID), and a routing table that indicates how the node transmits data between other nodes of the network. For example, a home ID can uniquely identify the entire monitoring system network such that each node device 222 of the monitoring system network is associated with the same home ID. Each node device 222 can be identified by a unique device ID that uniquely identifies each node device 222 and/or the control unit 210 in the monitoring system. Each node device 222 identified by a unique device ID is also associated with a unique routing table that indicates a network topology by which that node device 222 can communicate with other node devices 222 and/or the control unit 210 of the monitoring system 200.

In some instances, a home ID can be an alphanumeric code, for example, a 32-bit integer, or can be another code, such as a code that identifies a particular user (e.g., a user's name) or a code that identifies a particular geographical location of a property associated with the monitoring system (e.g., a set of geographical coordinates). In some instances, a device ID can also be an alphanumeric code, for example, an alphanumeric string that uniquely identifies a particular node of the monitoring system 200, a name or part number associated with a particular node of the monitoring system 200, or can be another code used to identify a particular node in the monitoring system 200.

In some instances, a routing table can be any data set or data structure (e.g., a table, array, linked list, etc.) that identifies data pathways to be used by a particular node of the monitoring system 200 to communicate with one or more other nodes of the monitoring system 200. For example, a routing table may indicate a single data pathway that may be used by a particular node to communicate any of the other nodes of the monitoring system 200. In another example, a routing table may indicate data pathways used by the node for communicating with each of the other nodes of the monitoring system's wireless network, such that each data pathway used by the node to communicate with each of the other nodes is unique.

When a node is added to the monitoring system 200 (e.g., when a node device 222 or a control unit 210 is added to the monitoring system network), the node is configured to communicate with other nodes of the monitoring system 200. Specifically, the node is assigned a home ID that is associated with the monitoring system 200, and a device ID that is unique from the device IDs of the other nodes of the monitoring system 200. The node performs a discovery process to identify other nodes of the monitoring system 200 and to determine data routing pathways between the node and the other nodes of the monitoring system 200. The home ID associated with the monitoring system's wireless network, the device ID associated with the node, and the data routing configuration used by the node to communicate with other nodes are stored by the node in memory storage associated with the node. For example, a node device 222 can store information identifying an assigned home ID, a device ID, and a data routing configuration used by the node device 222 at data storage associated with the node device 222 or at data storage associated with the node interface 220. For example, in some instances, the information identifying the home ID, device ID, and data routing pathways can be stored at a hard drive associated with the node device 222, or at a memory of the node device 222 (e.g., at an EEPROM associated with the node device 222). Each of one or more other nodes of the monitoring system 200 can likewise store the home ID that identifies the monitoring system 200 (or the monitoring system's network), a unique device ID, and data routing configuration information at its own data store. As described, each other node can be assigned the same home ID that uniquely identifies the monitoring system 200 or its wireless network, can be assigned a device ID that uniquely identifies that node, and can perform discovery to determine the data routing configuration of that node.

To provide reliability and robustness of the monitoring system 200, the network topology information of the monitoring system's wireless network is backed up at a backend of the monitoring system 200. For example, data identifying the home ID, device ID, and data routing configurations of each node of the monitoring system 200 can be stored at a backend of the monitoring system 200, such that the home ID, device ID, and/or data routing pathways of a particular node can be retrieved and transmitted to a particular node to restore communication functionality of the particular node or a replacement of the particular node in the monitoring system 200. By using stored network topology information to restore communications functionality of the particular node, the monitoring system 200 can avoid the need to perform a rediscovery process (e.g., an additional discovery process) when a node is replaced. Additionally, by restoring the particular node's home ID, device ID, and data routing configuration, other nodes of the monitoring system 200 can communicate with the particular node and other nodes of the monitoring system 200 as though the particular node was never disrupted or replaced (e.g., without performing an additional discovery process to account for the disrupted or replaced node).

Network topology information, such as data associated with a source routed network table that identifies a node home ID, device ID, and/or data routing configurations, can be backed up to the monitoring system's backend based on events detected by the monitoring system 200 and/or nodes of the monitoring system 200. For example, data routing configurations associated with one or more node devices 222 and/or the control unit 210 can be backed up at the network topology server 260 of the monitoring system 200. In some implementations, the data routing configuration for a particular node is stored by monitoring system 200 is backed up based on the particular node detecting an event (e.g., such that only data routing configuration information associated with the particular node detecting the event is backed up), or the network topology information that is stored by the monitoring system 200 is backed up based on any node detecting a particular event (e.g., such that the network topology information associated with the monitoring system 200 is backed up regardless of which node or nodes detects the event).

In some implementations, the monitoring system 200 backs up network topology information based on a node of the monitoring system performing network discovery. For example, when a new node device 222 (e.g., a new remote sensor node or new notification node device) is introduced into the monitoring system, the new node device 222 is assigned a home ID and device ID, and performs a discovery process to determine one or more data routing pathways to communicate with other node devices 222 and the control unit 210 of the monitoring system. Based on the node device 222 being assigned and/or determining the home ID, device ID, and/or data routing pathways, the monitoring system 200 can backup network topology information for the monitoring system's entire wireless network or can backup the data routing configuration of the node device 222, at a data store associated with the node device 222 or the node interface 220, or at the network topology server 260.

In some instances, determining a home ID and/or device ID of a new node device 222 can require a user of the monitoring system 200, for example, an administrator or installer associated of the monitoring system 200, to assign the home ID and/or device ID to the new node device 222. In other examples, the new node device 222 can determine a home ID and/or device ID automatically, for example, by detecting the home ID and/or device ID of other devices in the proximity of the new node device 222 (e.g., devices that the new node device 222 detects as being connected to a local network) or by randomly generating a home ID and/or device ID to assign to the new node device 222. In some examples, new node devices 222 can determine a home ID based on the new node devices 222 attempting to join a particular network, regardless of the proximity of the node devices 222 to other devices (e.g., in instances in which the new node devices 222 are connecting to a virtual private network (VPN), a GSM network, or an LTE network). Additionally, in some examples, a device ID assigned to a new node device 222 can be assigned sequentially based on the new node device 222 determining one or more device IDs of other node devices 222 that are a part of the monitoring system 200. For example, a new node device 222 may determine that other node devices 222 in a monitoring system have device IDs that terminate in "190," "191," and "192," and the new node device 222 can be assigned a device ID that terminates in "193." In some implementations, the one or more data routing pathways used by the node device 222 to communicate with other nodes of the monitoring system's wireless network can be assigned to the node device 222 when it is introduced into the monitoring system 200. For example, a user of the monitoring system 200 can determine data routing pathways that the node device 222 should use to communicate with other node devices 222 and/or the control unit 210, and can program the node device 222 to utilize the determined data routing pathways.

In some implementations, the monitoring system 200 backs up network topology information based on a rediscovery process being performed by the monitoring system 200 or one or more nodes of the monitoring system 200. For example, all of the nodes of the monitoring system 200 or a subset of the nodes of the monitoring system 200 can perform a rediscovery process similar to the initial discovery process based on detecting a particular event. For instance, based on determining that the monitoring system 200 is recovering from a power outage, that one or more nodes have been added to the monitoring system's wireless network, or that other events have occurred, the monitoring system 200 can perform a rediscovery process. After the monitoring system 200 has performed the rediscovery process, the monitoring system 200 can back up the monitoring system's network topology as it was determined by the rediscovery process. In some instances, the monitoring system 200 can back up data routing configurations associated only with those nodes of the monitoring system 200 that performed the rediscovery process or a subset of those nodes of the monitoring system 200 that performed the rediscovery process, or the monitoring system 200 can back up all or a subset of the nodes of the monitoring system 200 regardless of whether those nodes performed the rediscovery process.

For example, based on one or more node devices 222 determining that a new node device 222 has been introduced to the monitoring system 200, the one or more node devices 222 can perform a rediscovery process to determine data pathways used to communicate with the new node device 222. The monitoring system 200 can back up the network topology determined as a result of performing the rediscovery process. For example, the monitoring system 200 can store network topology information associated with the node devices 222 and the control unit 210 of the monitoring system 200.

In some implementations, the monitoring system 200 backs up network topology information based on determining that the monitoring system's wireless network has been modified. For example, the monitoring system 200 can determine that one or more node devices 222 have been added and/or removed from the monitoring system 200, and the monitoring system 200 can back up the network topology of the monitoring system's wireless network based on determining that the one or more node devices 222 have been added and/or removed from the monitoring system 200. In some examples, the monitoring system 200 can back up the network topology information prior to the nodes of the monitoring system 200 performing a rediscovery process. For instance, the monitoring system may determine that one or more node devices 222 have been added and/or removed from the monitoring system's wireless network, and the monitoring system 200 can back up the network topology prior to performing a rediscovery process to identify data pathways for communicating with the added nodes of the monitoring system 200. In other examples, the monitoring system 200 can back up the network topology after the nodes of the monitoring system 200 perform the rediscovery process to establish communication pathways with the other nodes of the monitoring system 200. In some instances, based on detecting modifications of the monitoring system 200, the monitoring system 200 can back up network topology information both prior to and after the nodes of the monitoring system 200 perform a rediscovery process (e.g., such that the network topology server 260 stores multiple instances of the network topology).

In some implementations, the monitoring system 200 backs up network topology information based on determining that software associated with one or more nodes of the monitoring system 200 requires an update. For example, each of the node devices 222 and/or node interfaces 220 can be associated with software, such as software stored in an EEPROM of the node devices 222 and/or the node interfaces 220. The software associated with the node devices 222 and/or node interfaces 220 may require an update, for example, to allow for communication with different types of node devices 222, to allow for communication with different control units 210, or to account for other changes in the monitoring system 200 (e.g., changes to an operating system associated with the monitoring system 200). Based on the software of the node devices 222 and/or node interfaces 220 requiring an update, the monitoring system 200 may back up network topology information associated with the node devices 222 of the monitoring system 200. In some instances, the monitoring system 200 may only back up network topology information associated with those nodes of the monitoring system 200 that are subject to the software update (e.g., only those node devices 222 that are having the software update installed), may back up network topology information associated with all nodes of the monitoring system 200, or may otherwise back up network topology information associated with a subset of the nodes of the monitoring system 200.

The monitoring system 200 may back up network topology information based on input provided by one or more users of the monitoring system 200. For example, a user of a property associated with the monitoring system 200 or an administrator associated with the monitoring system 200 (e.g., an administrator of a third party service associated with the monitoring system 200) may provide a request to back up network topology information associated with the monitoring system 200, and the monitoring system 200 may back up the network topology information in response to the request provided by the user or administrator.

In some instances, a user may provide input that requests the monitoring system 200 perform a back up of the monitoring system's network topology by backing up the data routing configurations associated with one or more specific nodes of the monitoring system 200. In response to the request that identifies the one or more specific nodes, the monitoring system 200 can back up the data routing configurations indicated by the request. For example, a user planning to replace one or more node devices 222 of the monitoring system 200 may provide input to the monitoring system 200 that causes the monitoring system 200 to back up the network topology information of the one or more node devices 222 prior to the user replacing the node devices 222, to ensure that the network topology information associated with the replaced node devices 222 is not lost. In other examples, a user may provide input that requests the monitoring system 200 perform back up of the data routing configurations of all of the nodes, and in response to the request, the monitoring system 200 can back up the data routing configurations of all of the monitoring system's nodes.

In some implementations, the monitoring system 200 may periodically back up network topology information. For example, the monitoring system 200 may be configured to back up its network topology every certain number of hours or days (e.g., every 6 hours or every 7 days), may be configured to back up its network topology on particular dates (e.g., on the first day of every month), or may otherwise be configured to back up its network topology based on other time conditions. In some instances, the timing or periodicity associated with backing up the network topology information may be configured by users of the monitoring system 200. For example, a user may be able to access a native application 242, 252 at a mobile device 240, 250 that enables the user to define when the monitoring system 200 backs up its network topology. In other instances, the timing or periodicity of backing up a network topology may be defined by the network topology server 260, or may be defined by other factors. For example, the monitoring system 200 (e.g., the network topology server 260) may determine an available bandwidth over the network 205, and may determine to back up the monitoring system's network topology based on determining that sufficient bandwidth is available over the network 205, and/or based on a particular timing condition being satisfied and based on sufficient bandwidth being available over the network 205.

In some implementations, the monitoring system 200 is capable of obtaining information from one or more sources that are external to the monitoring system 200. For example, the monitoring system 200 may be capable of receiving information indicating weather forecasts, information predicting or warning of potential power outages in the geographical region of a property associated with the monitoring system 200, or may be capable of receiving other information relevant to operating the monitoring system 200. In such implementations, the monitoring system 200 may determine to back up network topology information based on information received from the one or more other sources.

For example, the monitoring system 200 (e.g., the network topology server 260) may access information that indicates that a power outage is likely for the property. For instance, the monitoring system 200 may determine that a power outage is likely based on weather forecast data that indicates that strong storms are imminent for the geographical region of the property associated with the monitoring system 200. Similarly, the monitoring system 200 may determine that a rolling blackout may likely affect the geographical region of the property. Based on accessing the weather forecast data or the information indicating the potential rolling blackout, the monitoring system 200 may determine to perform back up of the monitoring system's network topology. Backing up the monitoring system's network topology based on the accessed information can enable the monitoring system 200 to restore the established network topology in the event of a power outage at the property. Therefore, backing up the network topology based on the accessed information can further reinforce the reliability and robustness of the monitoring system's wireless network, by enabling the monitoring system 200 to handle such events with reduced interruption of the monitoring services offered by the monitoring system 200.

Backing up a monitoring system's network topology can involve storing network topology information associated with one or more nodes of the monitoring system 200. For example, each node in the monitoring system 200 may store (e.g., at an EEPROM of the node) information that identifies a home ID, a device ID, one or more device IDs associated with other nodes of the monitoring system 200, and a routing table that indicates data routing pathways from the node to other nodes of the monitoring system 200. Backing up network topology information associated with the monitoring system 200 can involve storing all or a subset of the data routing configurations associated with one or more nodes at a backend of the monitoring system 200 (e.g., at the network topology server 260). In some implementations, backing up a monitoring system's network topology can involve storing all or a subset of the data routing configurations associated with one or more nodes of the monitoring system 200 at a local storage device, e.g., an optical readable drive, flash storage, or other device, associated with a device that is capable of communicating with the one or more nodes of the monitoring system 200. For instance, the device may be capable of receiving data specifying data routing configurations associated with one or more nodes of the monitoring system 200 over a universal serial bus (USB) connection, wireless free internet (WiFi) connection, or Bluetooth connection, and storing the data specifying the data routing configurations associated with the one or more nodes. Backing up the monitoring system's network topology can involve storing information identifying only the home ID and device IDs of one or more nodes of the monitoring system 200. In another example, backing up the monitoring system's network topology can involve storing, for each of one or more nodes of the monitoring system 200, information identifying the home ID, the device ID, and device IDs for each of the nodes of the monitoring system that the particular node communicates with in the monitoring system 200. In other examples, backing up a network topology can involve storing, for each of one or more nodes of the monitoring system 200, information identifying the home ID, a device ID for the particular node of the monitoring system 200, and device IDs for each of one or more other nodes of the monitoring system 200 that the particular node communicates with in the monitoring system 200, and a routing table indicating data pathways used by the particular node to communicate with the one or more other nodes of the monitoring system 200. In some instances, backing up a network topology can involve storing one or more settings associated with the monitoring system 200 or storing one or more settings associated with performing network topology back up. For example, the monitoring system 200 may back up information that indicates when backups of the network topology occur (e.g., information that indicates conditions associated with performing backups of the monitoring system's network topology).

In some instances, the monitoring system 200 can back up its wireless network topology by combining the data routing configurations of one or more nodes of the monitoring system 200 to form the backup of the network topology. For example, the network topology server 260 may combine information identifying the home ID, device ID, and routing table for each of one or more node devices 222 of the monitoring system 200 in a single data structure (e.g., a single table) that identifies the home ID, device ID, and routing table information of all of the one or more node devices 222, or a subset of the one or more node devices 222.

The monitoring system 200 may store a single backup of its network topology, or may store two or more backups of its network topology. In some instances, two or more backups of a network topology may be two or more identical backups of a network topology, for example, two or more backups of the monitoring system's network topology that are stored at different locations. For example, a first backup of the network topology may be stored at the network topology server 260 and one or more other backups of the network topology may be stored at the mobile devices 240, 250, at the control unit 210, or at another component of the monitoring system 200. In some instances, the two or more backups of the network topology can be two or more unique backups of monitoring system's network topology. The monitoring system 200 may store two or more instances of network topology that correspond to different times or to different configurations of the monitoring system 200.

As an example, the network topology server 260 can store a first instance of the monitoring system's network topology that identifies the network topology of the monitoring system 200 at a first point in time, and can store one or more other instances of the monitoring system's network topology that identify the network topology of the monitoring system 200 at one or more other points in time. When restoring the monitoring system's network topology using a backup of the network topology, a user of the monitoring system 200 and/or the monitoring system 200 may select a particular instance of the network topology to use in restoring the network topology, for example, an instance of the network topology information that is known to be reliable or the most recent.

In another example, the network topology server 260 can store a first network topology that corresponds to a first configuration of the monitoring system 200 (e.g., a first configuration of node devices 222 and a control unit 210), and can store one or more other network topologies that correspond to other configurations of the monitoring system 200 (e.g., one or more other configurations of node devices 222 and a control unit 210). When restoring the monitoring system's network topology using a backup of a network topology, a user of the monitoring system 200 and/or the monitoring system 200 may select a particular instance of the network topology to use in restoring the monitoring system's wireless network, for example, a backup of the network topology that corresponds to a current configuration of the monitoring system 200. Selecting a particular instance of the network topology to use in restoring the monitoring system's network topology can ensure that the restored wireless network is a reliable and robust configuration for the monitoring system 200. In some implementations, the monitoring system 200 may be capable of automatically or otherwise determining a configuration of the monitoring system 200, and may select a particular instance of the network topology in response to determining the configuration of the monitoring system 200.

Backup network topology information, such as data associated with a source routed network table stored by a monitoring system 200, can be used to restore the network topology of the monitoring system 200. For example, based on the monitoring system 200 storing a backup of the monitoring system's network topology at the network topology server 260, the monitoring system 200 can transmit relevant data routing configurations from the network topology server 260 to one or more node devices 222 of the monitoring system 200 and/or to a control unit 210 of the monitoring system 200, and the node devices 222 and/or control unit 210 can utilize the data routing configurations to restore the network topology of the monitoring system's wireless network. Restoring a monitoring system's wireless network using a backup network topology can involve providing backed up data routing configurations to a subset of the nodes of the monitoring system 200. In some instances, the monitoring system 200 only provides data routing configurations to nodes that are not already capable of communicating with the other nodes of the monitoring system 200, or only provides network topology information to nodes that require an updated data routing configuration to communicate with all of the nodes of the monitoring system 200 (e.g., such that the node's current data routing configuration is outdated). In other examples, the monitoring system 200 can provide backed up data routing configurations to all of the nodes of the monitoring system 200, regardless of whether the nodes require restoration or updating of their data routing configurations.

In some implementations, information specifying a network topology that is stored by a monitoring system 200 is used to restore the network topology of the monitoring system 200 based on one or more nodes being introduced to the monitoring system 200, removed from the monitoring system 200, or replaced in the monitoring system 200. For example, based on the monitoring system 200 determining that one or more node devices 222 have been removed from the monitoring system's wireless network, the monitoring system 200 may access a backup network topology and may provide information from the backup network topology to one or more of the remaining node devices 222 of the monitoring system 200, such that the remaining node devices 222 of the monitoring system 200 can determine data routing configurations to communicate with other nodes of the monitoring system 200 (e.g., by using a discovery process). In another example, based on the monitoring system 200 determining that one or more node devices 222 have been introduced into the monitoring system 200, the monitoring system 200 may access backed up network topology and provide information from the backed up network topology to one or more node devices 222 of the monitoring system 200, including the one or more node devices 222 that have been introduced into the monitoring system 200. The node devices 222 of the monitoring system 200 can each determine a data routing configuration based at least on the information from the backed up network topology. In still another example, one or more node devices 222 of the monitoring system 200 may be replaced by replacement node devices 222, and information from the backed up network topology can be provided to one or more node devices 222 of the monitoring system 200, including replacement node devices 222 and node devices 222 that have not been replaced, to establish a network topology of the monitoring system 200.

In some implementations, input provided by one or more users of the monitoring system 200 can cause the monitoring system 200 to back up its network topology. For example, a user or an administrator associated with the monitoring system 200 (e.g., an administrator of a third party service associated with the monitoring system 200) may input a request to the restore network topology of the monitoring system's wireless network using the backup network topology. In response to the request input by the user or administrator, the monitoring system 200 may restore the monitoring system's network topology using the backup network topology.

In some instances, a user or administrator may provide input that requests restoration of the data routing configurations for one or more specific nodes of the monitoring system 200, the restoration being based on the backup network topology. In response to receiving the request that identifies the one or more specific nodes, the monitoring system 200 can restore the data routing configurations of the one or more specific nodes using the backup network topology. For example, a user who has replaced one or more node devices 222 of the monitoring system 200 may provide input to the monitoring system 200 that causes the monitoring system 200 to restore the data routing configurations of the one or more replacement node devices 222. In other examples, a user may provide input that requests restoration of all of the nodes of the monitoring system 200 and, in response to the request, the monitoring system 200 can restore the data routing configurations of all of the nodes of the monitoring system 200 based on the backup network topology.

In some implementations, the monitoring system 200 is capable of obtaining information from one or more sources that are external to the monitoring system 200, or is capable of detecting certain conditions and/or events relating to the monitoring system 200. Based on information obtained from one or more sources external to the monitoring system 200, or based on conditions and/or events detected by the monitoring system 200, the monitoring system 200 can restore the data routing configurations of one or more nodes of the monitoring system using information from a backup network topology. For example, the monitoring system 200 may be capable of determining that a power outage has recently occurred at a property associated with the monitoring system 200, where the power outrage resulted in the monitoring system 200 losing power. Based on determining that power has been restored to the monitoring system 200, the monitoring system 200 can utilize the backup network topology to restore the network topology of the monitoring system's wireless network, and therefore to restore operability of the monitoring system 200. In another example, the monitoring system 200 may be capable of determining and/or storing performance metrics associated with the monitoring system 200, such as metrics indicating average times to transmit data between various nodes of the monitoring system's wireless network. Based on the monitoring system 200 determining that a current network topology used by the monitoring system 200 is less efficient than a backed up network topology, the monitoring system may utilize backup network topology to restore the more efficient network topology for use by the monitoring system 200.

In another example, the monitoring system 200 may be capable of receiving information indicating weather forecasts, information predicting or warning of potential power outages in the geographical region of the property associated with the monitoring system 200, or other information relevant to operation of the monitoring system 200. Based on accessing information that indicates that the monitoring system 200 may lose power, for example, due to a severe storm or rolling blackout, the monitoring system 200 may determine to enter a reduced power mode in which only necessary nodes of the monitoring system 200 are active (e.g., node devices 222 associated with door sensors that can detect an intruder entering the property). For example, the monitoring system 200 may enter a reduced power mode such that the monitoring system 200 can operate off of the power provided by an emergency power generator. To enter the reduced power mode, the monitoring system 200 may determine to use a backup network topology that enables only the necessary nodes of the monitoring system 200 to communicate with other necessary nodes of the monitoring system 200 (e.g., such that the necessary nodes are guaranteed to only use data pathways that include other necessary nodes) and/or the control unit 210 of the monitoring system 200, and that effectively disables or prohibits other unnecessary nodes from sending data between nodes in the monitoring system 200.

In some implementations, the monitoring system 200 may periodically restore the network topology of the monitoring system 200 using a backup network topology stored by the monitoring system 200. For example, the monitoring system 200 may store information for a backup network topology that represents a most-efficient network topology for a particular configuration of a monitoring system 200. The monitoring system 200 may be allowed to automatically modify the network topology as needed, for example, based on detected events and/or detected changes in the configuration of the monitoring system 200. Periodically, the network topology of the monitoring system 200 may be updated based on backup network topology information to restore a most-efficient network topology for a particular configuration of the monitoring system 200. In practice, other factors or events may be used to trigger the restoration of a monitoring system's wireless network topology using information specifying backup network topologies.

In some implementations, the monitoring system 200 can determine to restore the data routing configurations of one or more nodes of the monitoring system 200 using a backup network topology, and the monitoring system 200 can information specifying the backup network topology to the one or more nodes of the monitoring system 200 such that the one or more nodes can each determine data routing configurations that enable the nodes to communicate with other nodes of the monitoring system 200. For example, the monitoring system 200 can store a backup network topology that identifies a home ID and one or more device IDs associated with nodes of the monitoring system 200. Based on determining to restore the data routing configurations of one or more nodes of the monitoring system 200, the monitoring system 200 can provide information specifying the backed up network topology to each of the one or more nodes of the monitoring system 200. For instance, the network topology server 260 can provide information specifying the backed up network topology to the one or more nodes, where the information assigns each node the home ID and a particular device ID, and identifies the device IDs of the one or more other nodes of the monitoring system 200. Based on being assigned the home ID, the particular device ID, and receiving the information identifying the one or more other device IDs, the particular node of the monitoring system 200 can determine a data routing configuration to communicate with one or more other nodes of the monitoring system 200.

For instance, a particular node of the monitoring system 200 associated with a particular device ID can construct a data routing table based on the received network topology information, and can use the data routing table to communicate with the nodes associated with the one or more other device IDs. The particular node of the monitoring system 200 can construct the data routing table by exercising every permutation of data routing pathways between the particular node and the one or more other nodes (e.g., by performing a rediscovery process) to reconstruct the data routing table associated with the particular node. In such an implementation, the particular node may be capable of communicating with the one or more other nodes based on the reconstructed routing table. Additionally, one or more other nodes of the monitoring system 200 that have not had their data routing configurations determined or restored will be able to communicate with nodes of the monitoring system 200 that have restored their data routing configurations.

As an example, a particular node device 222 of the monitoring system 200 may be removed from the monitoring system 200 and replaced with a new node device 222. The monitoring system can restore the network topology of the monitoring system by providing the new node device 222 with information from the backed up network topology that specifies a data routing configuration for the new node device 222, such that the other node devices 222 and the control unit 210 of the monitoring system can communicate with the new node device 222 without the other node devices 222 and the control unit 210 detecting a change in the monitoring system 200 (e.g., by spoofing the other node devices 222 and the control unit 210). Similarly, the control unit 210 can be replaced with a new control unit 210, and the monitoring system 200 can restore the network topology of the monitoring system by providing the new control unit 210 with information from the backed up network topology such that the node devices 222 of the monitoring system 200 can communicate with the new control unit 210 without the node devices 222 detecting a change in the monitoring system's network topology. By spoofing the node devices 222 and/or the control unit 210, the monitoring system 200 can be modified and/or updated without requiring a rediscovery of the entire monitoring system's wireless network, a process that is typically time and battery consuming and may require manual setup by a user or administrator of the monitoring system 200.

In other implementations, the monitoring system 200 can determine to restore the data routing configurations of one or more nodes of the monitoring system 200 using the backup network topology, and the monitoring system 200 can provide information from the backup network topology to the one or more nodes of the monitoring system 200 such that the one or more nodes can use previously determined data pathways to communicate with other nodes of the monitoring system 200. For example, the monitoring system 200 can store information specifying a network topology that identifies a home ID, one or more device IDs, and information identifying data pathways that each node associated with a device ID can use to communicate with one or more other nodes associated with one or more other device IDs. Based on determining to restore the data routing configurations of the one or more nodes of the monitoring system 200, the monitoring system 200 can provide information from the backup network topology to each of the one or more nodes of the monitoring system 200.

For instance, the monitoring server can provide information from the backup network topology to the one or more nodes that assigns each node the home ID, a particular device ID, and that identifies a data routing table associated with the particular device ID that enables the device associated with the particular device ID to communicate with one or more other devices of the monitoring system 200 that are associated with one or more other device IDs. Based on being assigned the home ID, the particular device ID, and receiving the data routing table identifying data pathways by which the particular node can communicate with one or more other nodes of the monitoring system 200, the particular node can communicate with the one or more other nodes of the monitoring system 200 identified by the data routing table. In such an implementation, the nodes of the monitoring system 200 that have not had their network topologies restored will be able to communicate with nodes of the monitoring system 200 that have restored data routing configurations, such that the nodes that have not had their data routing configurations restored will not detect a difference in communicating with the nodes that have had their data routing configurations restored.

For example, a particular node device 222 of the monitoring system 200 may be removed from the monitoring system 200 and replaced with a new node device 222. The monitoring system 200 can restore the network topology of the wireless network of the monitoring system 200 by providing the new node device 222 with information specifying a data routing configuration such that the other node devices 222 and the control unit 210 of the monitoring system 200 can communicate with the new node device 222 without the other node devices 222 or the control unit 210 detecting a change in the monitoring system 200 (e.g., by spoofing the other node devices 222 and the control unit 210).

In other examples, a control unit 210 of the monitoring system 200 may be removed from the monitoring system 200 and replaced with a new control unit 210. The monitoring system 200 can restore the network topology of the monitoring system 200 by providing the new control unit 210 with information from the backup network topology such that the node devices 222 of the monitoring system 200 and the control unit 210 of the monitoring system 200 can communicate without the node devices 222 detecting a change in the monitoring system 200 (e.g., by spoofing the node devices 222).

While described in this disclosure primarily with respect to a mesh network and specifically with respect to a network operating under the Z-Wave network protocol, in practice other network architectures or network protocols may be utilized by the monitoring system 200. For example, the monitoring system's wireless network may utilize a ZigBee network. In such implementations, the home ID may be replaced by a personal area network identification code (PAN ID). In practice, other network protocols may be used as the monitoring system's wireless network, including networks that do not use a mesh topology, for example, Bluetooth networks, Wi-Fi networks, or other networks.

Additionally, while the present disclosure is described primarily with respect to a monitoring system, such as a home alarm system, home automation system, or other monitoring system, similar techniques may be applied to networks used in other applications. For example, similar network topology back up and restoration techniques can be used for other internet-based or locally-hosted applications or services. In other examples, the techniques may be used for other applications, for example, in other networks that include one or more devices, or that involve one or more other interacting machines (e.g., one or more other computers, mobile devices, or servers).

Figure 3:
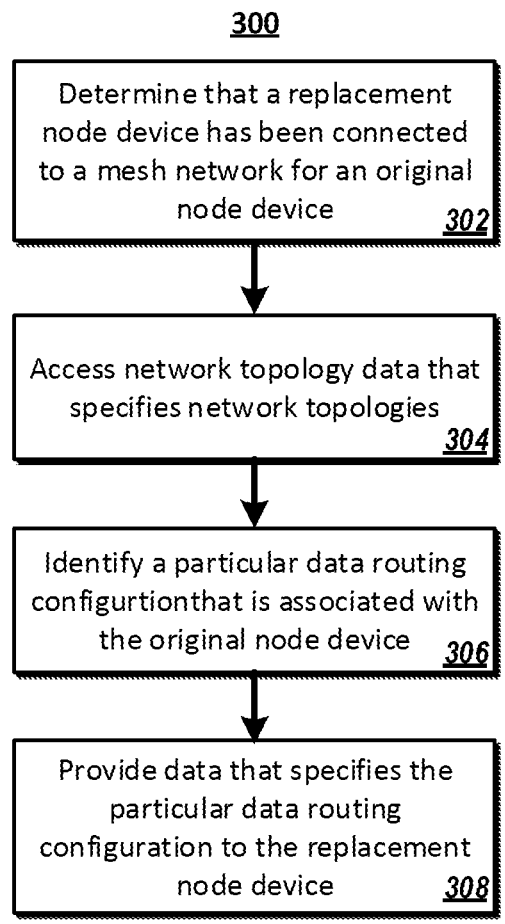
FIG. 3 depicts a flow chart of an example process.

FIG. 3 depicts an example process 300 for using a backup network topology to restore a data routing configuration for a node device included in a system's wireless network. For example, the monitoring system 200 associated with a wireless network can utilize backup network topology data to provide a data routing configuration to a particular node device 222 connected to the wireless network that enables the particular node device 222 to communicate with other node devices 222 of the wireless network, a control unit 210 of the wireless network, or a network topology server 260. The data routing configuration provided to the particular node device 222 can spoof the particular node device 222 such that the other node devices 222, control unit 210, and/or network topology server 260 communicate with the particular node device 222 without having to perform a rediscovery process to determine data communication pathways for communicating with the particular node device 222. Rather, the other node devices 222, control unit 210, and/or network topology server 260 communicate with the particular node device 222 using data communication pathways that were previously determined to enable the other node devices 222, control unit 210, and/or network topology server 260 to communicate with a node device 222 that has been removed from the monitoring system's wireless network. In some instances, the process 300 can also be applied to a control unit 210 that is connected to the monitoring system's wireless network, to spoof the control unit 210 and enable node devices 222 and/or the network topology server 260 to communicate with the control unit 210 as though it were a control unit 210 that was previously connected to the monitoring system's wireless network.

The connection of a replacement node device to the wireless network, such as a wireless mesh network, is detected as a replacement for an original node device that has been removed from the wireless network (302). For example, the monitoring system 200 can determine that a node device 222 has been connected to the monitoring system's wireless network that corresponds to an original node device 222 that has been removed from the monitoring system's wireless network. Determining that the node device 222 is a replacement for the original node device 222 may include determining that the replacement node device 222 is in range and/or otherwise capable of communicating with the same nodes of the wireless network of which the original node device 222 was capable of communicating. Alternatively, determining that the replacement node device 222 is a replacing the original node device 222 may include determining that the replacement node device 222 has at least the communication capabilities of the original node device 222, or otherwise determining that the replacement node device 222 can communicate using the data routing configuration used by the original node device 222.

Network topology data associated with the monitoring system's wireless network is accessed (304). For example, the network topology server 260 of the monitoring system 200 can store data specifying a backup network topology of the monitoring system's wireless network. In response to detecting the connection of the replacement node device 222 to the monitoring system 200, the monitoring system 200 can access the data specifying the backup network topology of the monitoring system's wireless network. The data specifying the backup network topology can be stored, for example, at a database or other data storage unit included in or accessible by the network topology server 260, or can be stored at another location accessible by the network topology server 260, for example, at a web domain or other online resource accessible by the network topology server 260.

A particular data routing configuration that is associated with the original node device is identified from the accessed network topology data. For example, the data specifying the backup network topology that is accessible by the network topology server 260 may specify one or more data routing configurations that are each associated with a different node device 222 or control unit 210 of the monitoring system 200. Each data routing configuration may identify data communication pathways used by a particular node device 222 or control unit 210 of the monitoring system 200 to communicate with other node devices 222, the control unit 210, or the network topology server 260 of the monitoring system 200. For instance, a data communication pathway may specify a series of node devices 222 that a particular node device 222 can use to relay data to the control unit 210, such that each of the node devices 222 in the series are used as jumping points where data transmitted from the particular node device 222 is relayed to another node device 222 in the series, such that the transmitted data will eventually arrive at the control unit 210. A particular data routing configuration that corresponds to the original node device 222 that has been replaced can be identified from among the one or more data routing configurations.

Data that specifies the particular data routing configuration associated with the original node device is provided to the replacement node device (308). For example, the monitoring system 200 can determine a data communication path between the network topology server 260 and the replacement node device 222, and the data specifying the data routing configuration associated with the original node device 222 can be transmitted to the replacement node device 222 using the data communication path. In some instances, the monitoring system 200 can determine a data communication path used to transmit the data specifying the data routing configuration to the replacement node device 222, for example, by performing a discovery process. In other instances, the monitoring system 200 may utilize a data communication path previously used to communicate between the network topology server 260 and the original node device 222 to provide the data specifying the data routing pathway associated with the original node device 222 to the replacement node device 222. Thus, providing the data specifying the data routing configuration associated with the original node device 222 to the replacement node device 222 can involve transmitting the data specifying the data routing configuration associated with the original node device over the network 105, and via the control unit 110 and/or one or more other node devices 222 to the replacement node device 222.

Once the replacement node device 222 has been provided the data specifying the data routing configuration associated with the original node device 222, the replacement node device 222 can utilize the data routing configuration to communicate with other node devices 222, the control unit 210, and/or the network topology server 260 of the monitoring system 200. Additionally, the replacement node device's use of the data routing configuration associated with the original node device 222 can spoof the replacement node device 222 such that other node devices 222, the control unit 210, and/or the network topology server 260 of the monitoring system 200 can communicate with the replacement node device 222 without having to discover data communication pathways to the replacement node device 222. Rather, the other node devices 222, control unit 210, and/or network topology server 260 can use previously determined data communication paths to communicate with the replacement node device 222, negating a need to perform a full rediscovery of the monitoring system's wireless network topology to enable communications with the replacement node device 222.

Figure 4:
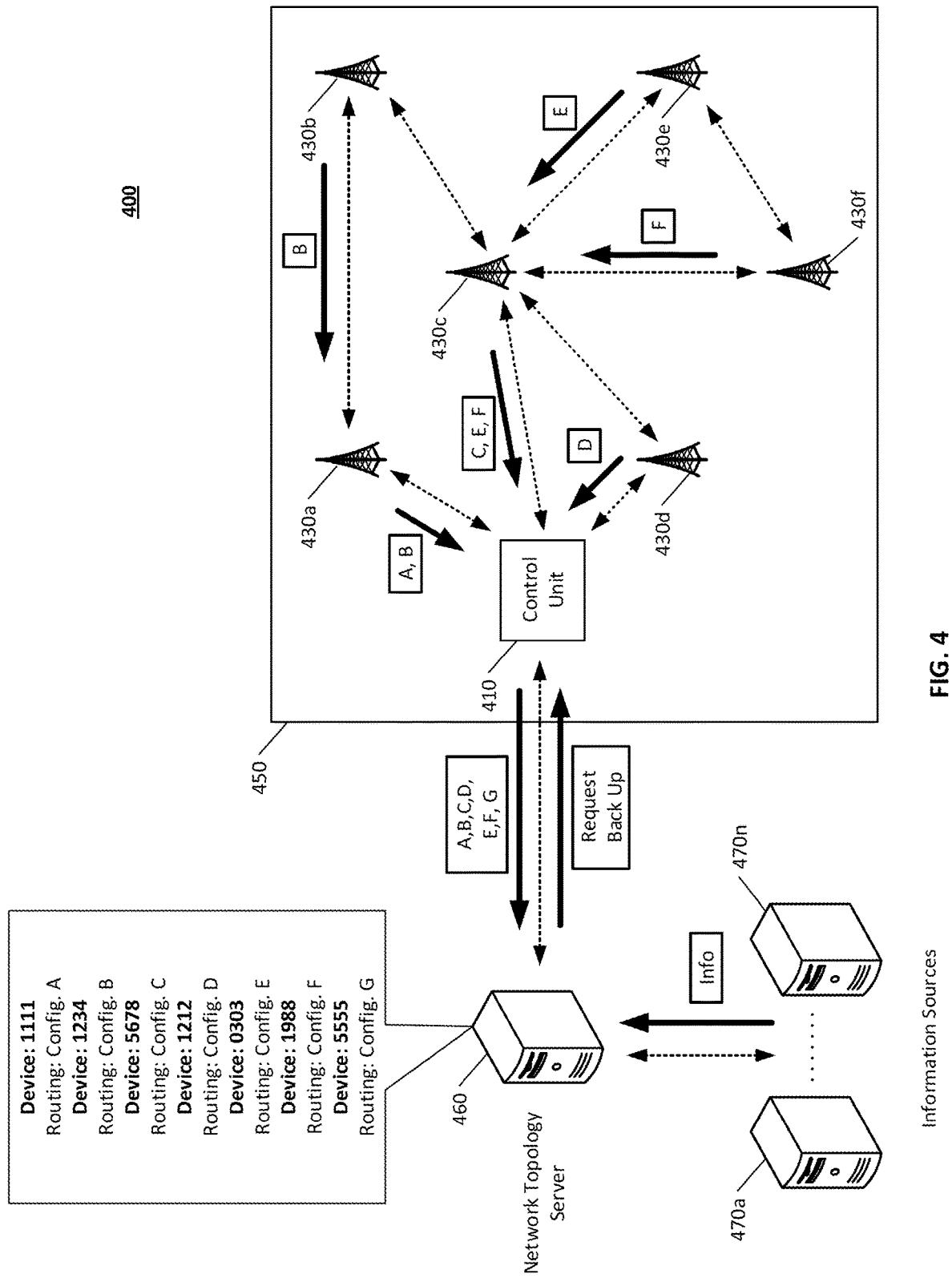
FIG. 4 illustrates an example of backing up a network topology in response to a request.

FIG. 4 illustrates an example of backing up a monitoring system's wireless network topology based at least partially on information obtained from external information sources. As shown in FIG. 4, the monitoring system 400 includes a control unit 410 and node devices 430a-430f associated with a property 450, a network topology server 460, and one or more information sources 470a-470n. The control unit 410, network topology server 460, and one or more information sources 470a-470n may be in communication over one or more networks, such as the network 105.

As shown in FIG. 4, the network topology server 460 can receiving information from the information sources 470a-470n. The information received from the information sources 470a-470n may include, for example, information that indicates a current time, day, or date, information that indicates the weather or possible severe weather for the geographical location of the property 450, information that indicates the likelihood of events affecting power at the property 450 or affecting power at the location of the network topology server 460, information that indicates available software updates relevant to the monitoring system 400, information that indicates financial information of users of the property 450 or information relating to the cost or payment of services associated with the monitoring system 400, information specifying user preferences or schedules relating to the backup or restoration of the monitoring system's wireless network topology, or other information relating to the backup and/or restoration of the monitoring system's wireless network topology.

The network topology server 460 can receive the information from the information sources 470a-470n, and can request backup of the network topology of the monitoring system's wireless network. Requesting backup of the network topology can involve requesting backup of the data routing configurations of one or more of the node devices 430a-430f of the monitoring system 400. For example, as shown in FIG. 4, the network topology server 460 can request backup of the entire network topology, including the data routing configurations of each of the node devices 430a-430f and the control unit 410.

The network topology server 460 can determine to update the network topology based on performing an analysis of the information received from the information sources 470a-470n. For example, based on receiving weather data and/or information indicating possible power interruptions at the property 450 and/or the location of the network topology server 460, the network topology server 460 can determine that there is a likelihood that strong weather or other factors may result in a loss of power at the property 450 and/or the location of the network topology server 460. Since such a power disruption may cause the loss of the network topology of the monitoring system's wireless network, for example, if the node devices 430a-430n lose power, the network topology server 460 may request backup of the monitoring system's wireless network topology. In another example, if a time, day, or date information received from the information sources 470a-470n satisfies a particular time-based schedule for backing up of the network topology, the network topology server 460 may request backup of the monitoring system's network topology. Other examples are described with respect to FIG. 2.

The request by the network topology server 460 can be transmitted to the control unit 410, for example, over a network such as the network 205, and can be received by the control unit 410. In response to receiving the request, the control unit 410 can request that each of the node devices 430a-430f transmit data specifying their respective data routing configurations to the control unit 410 and/or the network topology server 460. For example, the control unit 410 can utilize its own data routing configuration, "Configuration G," to communicate the request to each of the node devices 430a-430f.

In response to receiving a request to provide data specifying its data routing configuration, each of the node devices 430a-430f can transmit information to the control unit 410 that specifies their respective data routing configuration. For example, the node device 430a can transmit data specifying its data routing configuration, "Configuration A," to the control unit 410. Similarly, the node device 430b associated with the data routing configuration "Configuration B," the node device 430c associated with the data routing configuration "Configuration C," the node device 430d associated with the data routing configuration "Configuration D," the node device 430e associated with the data routing configuration "Configuration E," and the node device 430f associated with the data routing configuration "Configuration F," can each transmit data specifying their respective data routing configurations to the control unit 410. Each node device 430a-430f may transmit the data specifying their respective data routing configurations using the data communication paths for communicating the with control unit 410. For example, the data routing configuration associated with the node device 430f may specify that the node device 430f communicates with the control unit 410 via the node device 430c, and the node device 430f can provide data specifying its data routing configuration to the node device 410 via the node device 430c according to the data communication path specified by its data routing configuration. The control unit 410 can transmit information specifying the data routing configurations of the node devices 430a-430f and its own data routing configuration "Configuration G" to the network topology server 460.

In some implementations, the information specifying the data routing configuration of each of the node devices 430a-430f and the control unit 410 can also specify a device identifier or "device ID" associated with each of the node devices 430a-430f and the control unit 410. For example, the node device 430a may be associated with the device ID "1111," the node device 430b may be associated with the device ID "1234," the node device 430c may be associated with the device ID "5678," the node device 430d may be associated with the device ID "1212," the node device 430e may be associated with the device ID "0303," the node device 430f may be associated with the device ID "1988," and the control unit 410 may be associated with the device ID "5555," and the data specifying the data routing configurations associated with each of the node devices 430a-430f and the control unit 410 may additionally specify the respective device ID of each of the node devices 430a-430f and the control unit 410.

The network topology server 460 can receive the data specifying the data routing configurations of each of the requested nodes of the monitoring system's wireless network, such as data specifying the data routing configurations of each of the node devices 430a-430f and the control unit 410, and can store the data specifying the data routing configurations as a backup network topology for the monitoring system's wireless network. For example, the network topology server 460 can store the data associated with the backup network topology locally at the network topology server 460, at a database or other data storage unit accessible to the network topology server 460, or at another location accessible to the network topology server 460, such as a web-based resource.

Figure 5A:
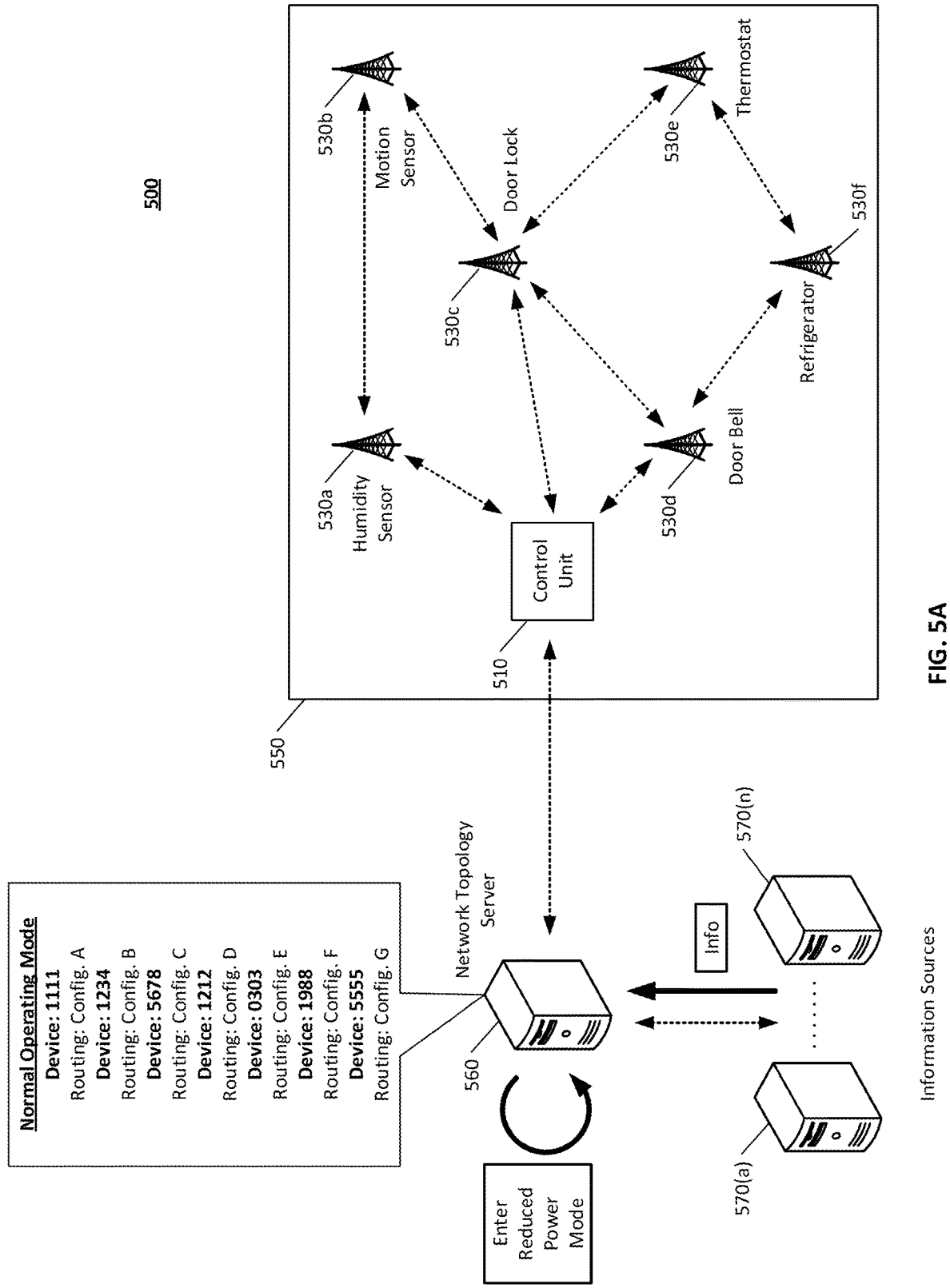
FIGS. 5A-5B illustrate an example of restoring a network topology to a reduced power network topology.
Figure 5B:
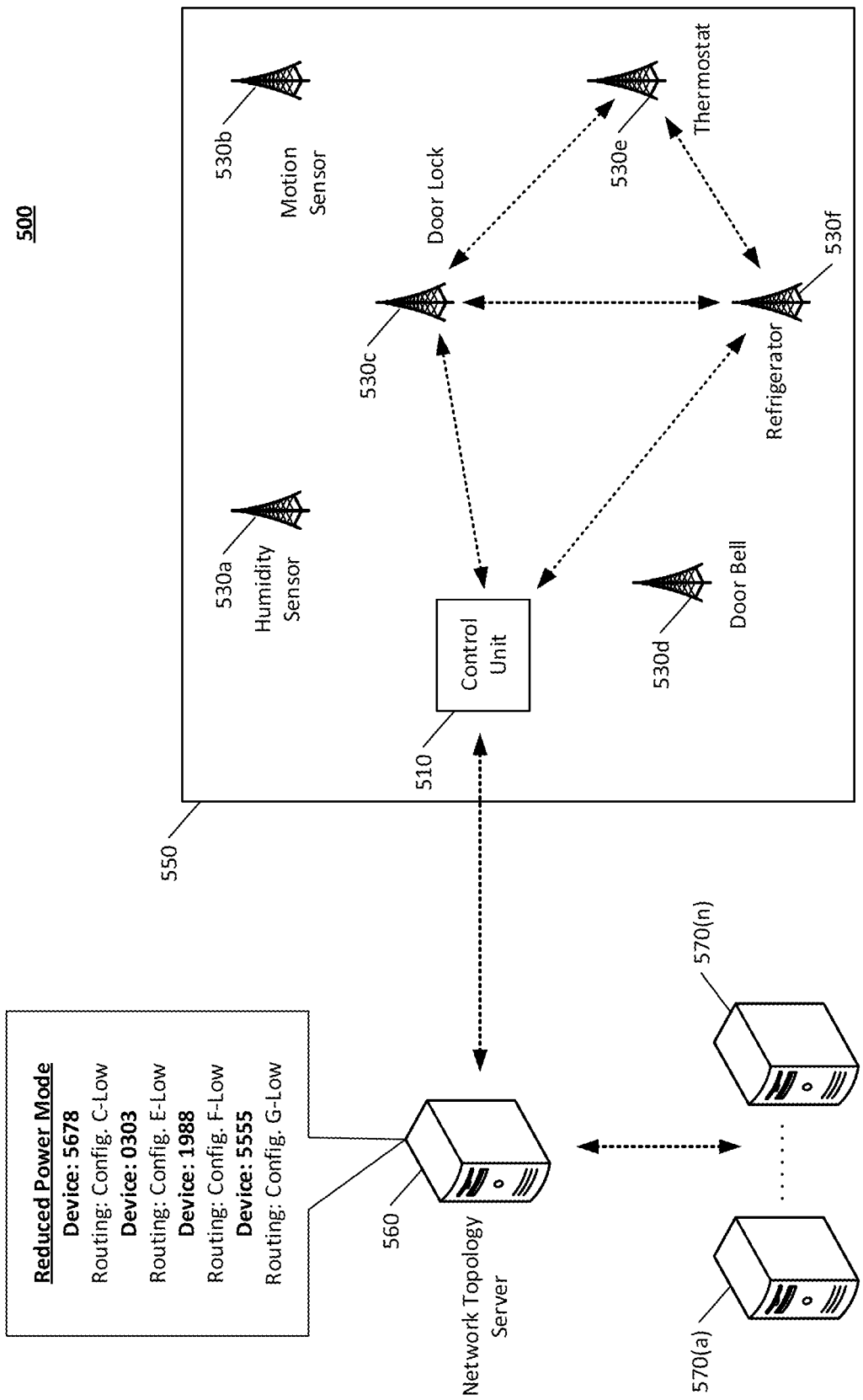

FIGS. 5A and 5B illustrate an example in which a monitoring system can backup multiple network topologies and can change a network topology used by the monitoring system's wireless network. For example, the monitoring system 500 can operate using a normal operating mode that allows for communication with the node devices 530a-530f and a control unit 510, and can also operate according to a reduced power mode that allows for communication with the node devices 530c, 530e, and 530f, and the control unit 510. As shown in FIGS. 5A and 5B, the monitoring system 500 can include the node devices 530a-530f, the control unit 510, the network topology server 560, and the information sources 570a-570n. In some implementations, the control unit 510, the network topology server 560, and the information sources 570a-570n can communicate over a network, such as the network 205.

As shown in FIG. 5A, at a first time the wireless network of the monitoring system 500 can operate according to a normal operating mode. The normal operating mode can enable communications between one or more of the network topology server 560, the control unit 510, and the node devices 530a-530f For example, the monitoring system 500 can operate according to the methods discussed with respect to FIG. 2 to allow for communications between the node devices 530a-530f, the control unit 510, and the network topology server 560. The node devices 530a-530f may each be associated with, respectively, a humidity sensor, a motion sensor, a door lock, a door bell, a thermostat, and a refrigerator.

The network topology server 560 can receiving information from the information sources 570a-570n. The network topology server 560 can analyze the received data and determine to enter a reduced power mode. For example, the information received from the information sources 570a-570n may indicate that a power disruption is likely at the property 550. Based on the information, the network topology server 560 may determine to enter a reduced power mode for the monitoring system 500. The reduced power mode may specify, for example, a network topology for the monitoring system's wireless network that only includes devices that are critical to the monitoring system 500 and that can be operated, for example, using battery power or backup generator power available to the monitoring system 500.

Based on determining to enter the reduced power mode, the network topology server 560 can access network topology data that specifies a reduced power mode network topology for the monitoring system's wireless network. As shown at FIG. 5B, the reduced power mode network topology may only specify data routing configurations for particular node devices 530c, 530e, and 530f that have been identified as critical node devices or user-selected node devices. The data routing configurations included in the reduced power mode network topology may enable communications with the critical or user-selected node devices to be maintained, even if communications with other node devices is lost. For example, reduced power mode network topology shown at FIG. 5B includes data routing configurations for the control unit 510, identified as "Configuration G-Low" associated with the device identifier or "device ID" of the control unit 510, "5555." The reduced power mode network topology may also specify data routing configurations for the node device 530c associated with the door lock, identified as "Configuration C-Low" and associated with the device ID "5678" corresponding to the node device 530c, node device 530e associated with the thermostat, identified as "Configuration E-Low" and associated with the device ID "0303" corresponding to the node device 530e, and the node device 530f associated with the refrigerator, identified as "Configuration F-Low" and associated with the device ID "1988" corresponding to the node device 530f.

The network topology server 560 can provide the reduced power mode network topology to the control unit 510 and the node devices 530a-530f to enable the monitoring system 500 to reduce power consumption and communicate with the control unit 510 and the node devices 530c, 530e, and 530f according to the reduced power mode network topology. As described, the relevant data routing configurations can be provided to each of the control unit 510 and the node devices 530c, 530e, and 530f to enable the control unit 510 and the node devices 530c, 530e, and 530f to communicate according to the reduced power mode network topology. In some implementations, providing the reduced power mode network topology to the control unit 510 and the node devices 530c, 530e, and 530f can further involve transmitting data to the other node devices 530a, 530b, and 530d that either removes the data routing configurations of those node devices, blocks communications by those node devices, deactivates those node devices, updates the data routing configurations of those node devices such that they cannot communicate with other components of the monitoring system 500, or otherwise disables those node devices from communicating with the other node devices 530a-530f, the control unit 510, or the network topology server 560.

In some implementations, data specific data routing configurations for a particular node device 530a-530f may differ between different network topologies. For example, the node device 530f may communicate with other node devices 530a-530f, the control unit 510, or network topology server 560 via the node devices 530d or 530e while operating using a normal operating mode network topology, and may communicate with other node devices 530a-530f, the control unit 510, or the network topology server 560 via the node devices 530c or 530e while operating using the reduced power mode network topology. Thus, the data routing configurations associated with the node 530f may be identified as "Configuration F" when operating according to the normal operating mode network topology at FIG. 5A and as "Configuration F-Low" when operating according to the recued power mode network topology at FIG. 5B.

Figure 6:
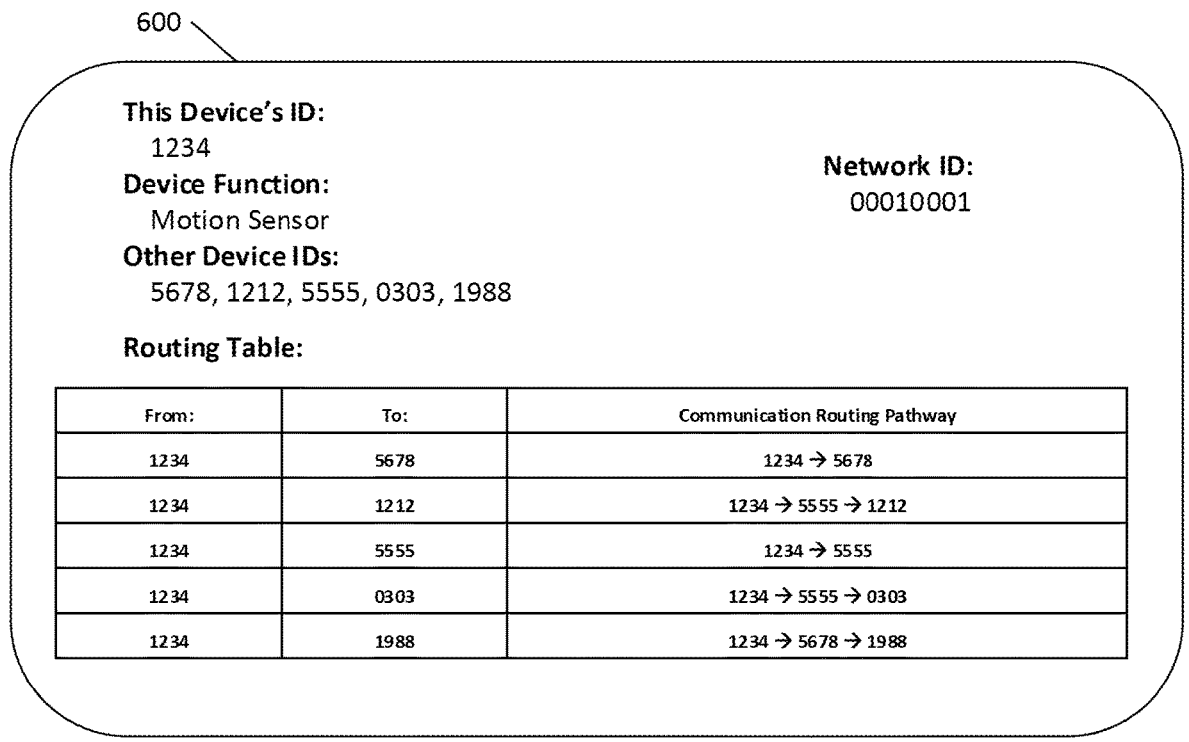
FIG. 6 depicts an example of a routing table associated with a network topology.
Figure 6:
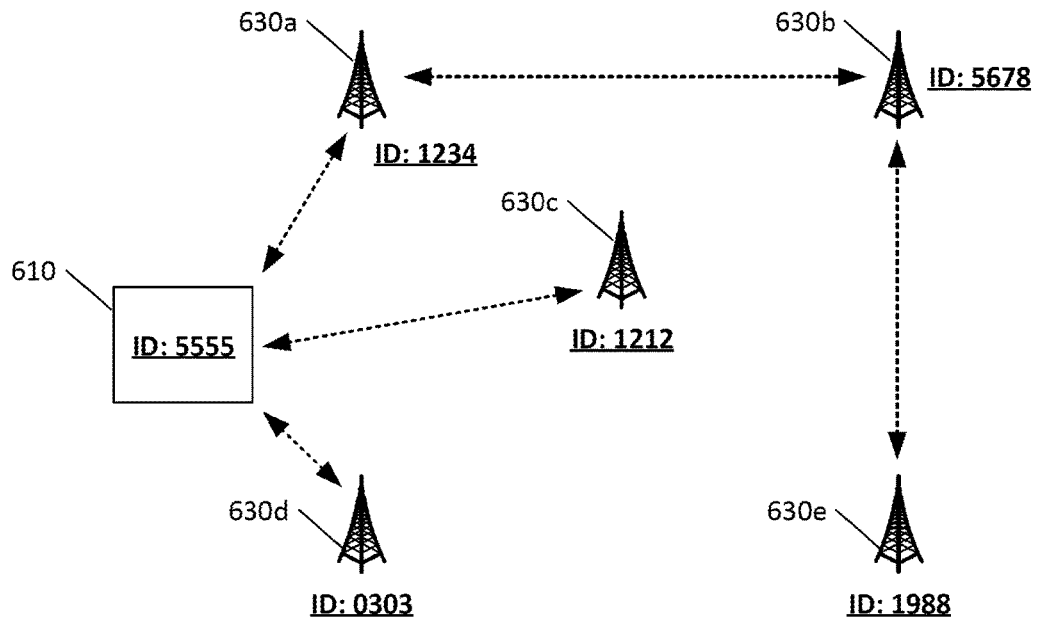

FIG. 6 illustrates an example of a data routing configuration for a particular node in a network. As shown at FIG. 6 and discussed, the data routing configuration can be included in a network topology for the network, and can be a data routing table that indicates data communication paths between various node devices.

The example data routing configuration 600 shown at FIG. 6 corresponds to the node device 630a included a network of node devices 630a-630e and the control unit 610. The node device 630a is associated with a device identifier or "device ID" of "1234," the node device 630b is associated with the device ID "5678," the node device 630c is associated with the device ID "1212," the node device 630d is associated with the device ID "0303," the node device 630e is associated with the device ID "1988," and the control unit 610 is associated with the device ID "5555." The data routing configuration 600 indicates information associated with the node device 630a, and includes a data routing table that specifies how the node device 630a associated with the device ID "1234" communicates with the other node devices 630b-630e and the control unit 610.

Specifically, as shown at FIG. 6, the data routing configuration indicates that the node device 630a is associated with a device identifier of "1234" and a network identifier or "network ID" of "00010001." As discussed, each of the other node devices 630b-630e and the control unit 610 may also be associated with the network ID of "00010001," such that the network ID identifies the entire network, for example, an entire wireless network associated with a monitoring system. The data routing configuration 600 also indicates a function associated with the node device 630a, specifically that the node 630a is a motion sensor, and indicates the other device IDs with which the node device 630a associated with the device ID "1234" can communicate. Namely, the node device 630a can also communicate with the node device 630b associated with the device ID "5678," the node device 630c associated with the device ID "1212," the node device 630d associated with the device ID "0303," the node device 630e associated with the device ID "1988," and the control unit 610 associated with the device ID "5555." The routing table of the data routing configuration 600 indicates data communication paths between the node device 630a and the other node devices 630b-630e and control unit 610 that the node device 630a can communicate with in the network. For example, the data routing table indicates that the node device 630a communicates with the node device 630b by transmitting directly to the node device 630b, shown as "1234→5678" in the data routing table. The data routing table indicates that the node device 630a communicates with the node device 630c via the control unit 610, shown as "1234→5555→1212" in the data routing table. The data routing table indicates that the node device 630a communicates with the control unit 610 directly, shown as "1234→5555" in the data routing table. The data routing table indicates that the node device 630a communicates with the node device 630d via the control unit 610, shown as "1234→5555→0303" in the data routing table. The data routing table indicates that the node device 630a communicates with the node device 630e via the node device 630b, shown as "1234→5678→1988" in the data routing table. The node device 630a can utilize the data routing table in the data routing configuration 600 to communicate with other node devices 630b-630e or the control unit 610 according to the specific data communication paths specified for a particular "To/From" pair in the data routing table.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
storing, by a network server, network topology data that specifies data routing configurations for a plurality of node devices connected to a mesh network;
determining to back up a data routing configuration for a node device of the plurality of node devices, including:
determining that particular software associated with the node device or the mesh network has been updated or requires updating, or
determining that a power interruption affecting the mesh network is likely to occur;
based on the determination to back up the data routing configuration for the node device of the plurality of node devices, storing, at the network server, the data routing configuration for the node device as a backup routing configuration for the node device;
obtaining, from the node device, data that specifies an updated data routing configuration for the node device;
determining that the updated data routing configuration is different from the stored data routing configuration for the node device; and
based on the determination that the updated data routing configuration is different from the stored data routing configuration, storing, at the network server, data that specifies the updated data routing configuration for the node device as the backup routing configuration for the node device.

2. The method of claim 1, wherein the node device comprises a replacement node device corresponding to an original node device that has been removed from the mesh network.

3. The method of claim 1, wherein determining to back up the data routing configuration for the node device further comprises determining that a duration of time since a previous back up of the data routing configuration for the node device is greater than a threshold period of time.

4. The method of claim 1, wherein determining to back up the data routing configuration for the node device further comprises determining that a current time satisfies a predetermined schedule for backing up the data routing configuration for the node device.

5. The method of claim 1, wherein determining to back up the data routing configuration for the node device comprises determining that the particular software associated with the node device or the mesh network has been updated or requires updating.

6. The method of claim 1, wherein determining to back up the data routing configuration for the node device further comprises determining that a connection of the node device to the mesh network has been established.

7. The method of claim 1, wherein determining to back up the data routing configuration for the node device comprises determining that the power interruption affecting the mesh network is likely to occur.

8. The method of claim 1, wherein determining to back up the data routing configuration for the node device further comprises determining that a request has been received from a user to back up the data routing configuration for the node device.

9. The method of claim 1, wherein determining to back up the data routing configuration for the node device further comprises determining that one or more of the plurality of node devices have been removed from the mesh network.

10. The method of claim 1, comprising:
initiating a network discovery process to cause each of the plurality of node devices connected to the mesh network to determine a respective data routing configuration, wherein each of the data routing configurations specifies at least a set of routing instructions that enables node devices connected to the mesh network to communicate with one or more other node devices connected to the mesh network;
after initiating the network discovery process, receiving data that specifies the data routing configurations; and
storing network topology data that specifies each of the received data routing configurations.

11. The method of claim 1, wherein each of the plurality of node devices connected to the mesh network is associated with (i) a network identifier that uniquely identifies the mesh network, the network identifier being the same for each node device connected to the mesh network, and (ii) a device identifier that uniquely identifies one of the plurality of node devices connected to the mesh network, the device identifier being different for each of the plurality of node devices connected to the mesh network.

12. The method of claim 1, wherein the network topology data includes one or more routing tables, linked lists, or multidimensional arrays that specify communication pathways for each of the plurality of node devices connected to the mesh network, wherein each communication pathway enables a particular node device connected to the mesh network to communicate with another node device connected to the mesh network.

13. The method of claim 1, wherein the network topology data is accessed from the network server over one or more networks that are separate from the mesh network.

14. The method of claim 1, wherein each node device of the plurality of node devices is configured to generate status information and transmit the status information over the mesh network.

15. A non-transitory computer-readable storage medium coupled to at least one processor having stored thereon instructions which, when executed by the at least one processor, causes the at least one processor to perform operations comprising:
storing network topology data that specifies data routing configurations for a plurality of node devices connected to a mesh network;
determining to back up a data routing configuration for a node device of the plurality of node devices, including:
determining that particular software associated with the node device or the mesh network has been updated or requires updating, or
determining that a power interruption affecting the mesh network is likely to occur;
based on the determination to back up the data routing configuration for the node device of the plurality of node devices, storing the data routing configuration for the node device as a backup routing configuration for the node device;
obtaining, from the node device, data that specifies an updated data routing configuration for the node device;
determining that the updated data routing configuration is different from the stored data routing configuration for the node device; and
based on the determination that the updated data routing configuration is different from the stored data routing configuration, storing data that specifies the updated data routing configuration for the node device as the backup routing configuration for the node device.

16. The non-transitory computer-readable storage medium of claim 15, wherein the node device comprises a replacement node device corresponding to an original node device that has been removed from the mesh network.

17. The non-transitory computer-readable storage medium of claim 15, wherein determining to back up the data routing configuration for the node device further comprises determining that a duration of time since a previous back up of the data routing configuration for the node device is greater than a threshold period of time.

18. The non-transitory computer-readable storage medium of claim 15, wherein determining to back up the data routing configuration for the node device further comprises determining that a current time satisfies a predetermined schedule for backing up the data routing configuration for the node device.

19. The non-transitory computer-readable storage medium of claim 15, wherein determining to back up the data routing configuration for the node device comprises determining that the particular software associated with the node device or the mesh network has been updated or requires updating.

20. A system comprising:
   a plurality of node devices connected to a mesh network; and
   a network server including at least one processor and at least one non-transitory computer-readable storage medium coupled to the at least one processor having stored thereon instructions which, when executed by the at least one processor, causes the at least one processor to perform operations comprising:
      storing, by the network server, network topology data that specifies data routing configurations for the plurality of node devices connected to the mesh network;
      determining to back up a data routing configuration for a node device of the plurality of node devices, including:
         determining that particular software associated with the node device or the mesh network has been updated or requires updating, or
         determining that a power interruption affecting the mesh network is likely to occur;
      based on the determination to back up the data routing configuration for the node device of the plurality of node devices, storing, at the network server, the data routing configuration for the node device as a backup routing configuration for the node device;
      obtaining, from the node device, data that specifies an updated data routing configuration for the node device;
      determining that the updated data routing configuration is different from the stored data routing configuration for the node device; and
      based on the determination that the updated data routing configuration is different from the stored data routing configuration, storing, at the network server, data that specifies the updated data routing configuration for the node device as the backup routing configuration for the node device.

* * * * *